(12) United States Patent
Johnson et al.

(10) Patent No.: US 8,070,039 B1
(45) Date of Patent: Dec. 6, 2011

(54) LINEAR FRICTION WELDER

(75) Inventors: Stephen A. Johnson, South Bend, IN (US); Thaddeus W. Gorski, Hanna, IN (US)

(73) Assignee: APCI, Inc., South Bend, IN (US)

( * ) Notice: Subject to any disclaimer, the term of this patent is extended or adjusted under 35 U.S.C. 154(b) by 0 days.

(21) Appl. No.: 12/868,623

(22) Filed: Aug. 25, 2010

(51) Int. Cl.
*B23K 20/12* (2006.01)

(52) U.S. Cl. ............................. 228/2.1; 228/8
(58) Field of Classification Search .................. None
See application file for complete search history.

(56) References Cited

U.S. PATENT DOCUMENTS

| | | | | |
|---|---|---|---|---|
| 3,058,513 A * | 10/1962 | Schaub et al. | ............... | 156/502 |
| 3,388,849 A * | 6/1968 | Blum et al. | ................... | 228/2.3 |
| 3,542,275 A * | 11/1970 | Loyd et al. | ..................... | 228/2.1 |
| 3,554,845 A * | 1/1971 | Billett et al. | .................. | 156/580 |
| 3,591,068 A * | 7/1971 | Farmer et al. | .................. | 228/2.3 |
| 3,671,049 A * | 6/1972 | Stamm | ........................ | 279/4.01 |
| 3,701,708 A * | 10/1972 | Brown et al. | ................. | 156/582 |
| 3,791,569 A * | 2/1974 | Mims | .............................. | 228/1.1 |
| 3,822,821 A * | 7/1974 | Clarke | ........................... | 228/2.1 |
| 3,848,792 A * | 11/1974 | Mims | .............................. | 228/1.1 |
| 3,860,468 A | 1/1975 | Scherer | | |
| 3,920,504 A * | 11/1975 | Shoh et al. | .................... | 156/580 |
| 3,972,465 A * | 8/1976 | Takaoka et al. | ............ | 228/114.5 |
| 4,043,497 A * | 8/1977 | Jones | ............................. | 228/2.3 |
| 4,087,036 A * | 5/1978 | Corbett et al. | ................. | 228/102 |
| 4,247,346 A * | 1/1981 | Maehara et al. | ............. | 156/73.5 |
| 4,270,495 A | 6/1981 | Freudenstein et al. | | |
| 4,470,868 A * | 9/1984 | MacLaughlin et al. | ....... | 156/423 |
| 4,552,609 A * | 11/1985 | Larsen | ........................... | 156/358 |
| 4,811,887 A * | 3/1989 | King et al. | ...................... | 228/2.3 |
| 4,858,815 A | 8/1989 | Roberts et al. | | |
| 4,995,544 A * | 2/1991 | Searle | ........................... | 228/2.1 |
| 5,100,044 A * | 3/1992 | Searle | ......................... | 228/112.1 |
| 5,141,591 A * | 8/1992 | Boek et al. | ..................... | 156/502 |
| 5,366,344 A | 11/1994 | Gillbanks et al. | | |
| 5,853,119 A | 12/1998 | Searle | | |
| 6,003,752 A | 12/1999 | Searle et al. | | |
| 6,102,272 A | 8/2000 | Searle et al. | | |
| 6,145,730 A | 11/2000 | Wiesemann | | |
| 6,328,087 B1 * | 12/2001 | Finzo et al. | .................... | 156/494 |
| 6,357,506 B1 * | 3/2002 | Nomura et al. | ............... | 156/580 |
| 6,688,512 B2 | 2/2004 | Trask | | |

(Continued)

FOREIGN PATENT DOCUMENTS

EP 0355867 8/1994

(Continued)

OTHER PUBLICATIONS

Addison, "Linear Friction Welding of Engineering Materials," Research Report © TWI Ltd., Feb. 2008, United Kingdom (34 pages).

(Continued)

*Primary Examiner* — Kiley Stoner
(74) *Attorney, Agent, or Firm* — Maginot, Moore & Beck LLP

(57) ABSTRACT

A linear friction welding system in one embodiment includes a ram configured to vibrate along a welding axis, a cam follower operably connected to the ram, an eccentric including an eccentric outer periphery operably engaged with the cam follower, and an inner periphery, a first power shaft slidingly engaged with the eccentric, and a second power shaft eccentrically engaged with the inner periphery.

20 Claims, 13 Drawing Sheets

U.S. PATENT DOCUMENTS

| | | | |
|---|---|---|---|
| 2004/0216432 A1* | 11/2004 | Lopez | 53/589 |
| 2006/0231593 A1 | 10/2006 | Bayer et al. | |
| 2009/0145948 A1* | 6/2009 | Pfeiler | 228/2.1 |
| 2009/0321497 A1 | 12/2009 | Alessi et al. | |
| 2011/0056629 A1* | 3/2011 | Kawaura et al. | 156/580 |

FOREIGN PATENT DOCUMENTS

| | | | |
|---|---|---|---|
| EP | 999133 A | * | 5/2000 |
| GB | 1332712 | | 10/1973 |
| JP | 2002-153975 A | * | 5/2002 |
| JP | 2009-298411 A | * | 12/2009 |

OTHER PUBLICATIONS

Addison, "Linear Friction Welding Information for Production Engineering," Research Report © TWI Ltd., Jul. 2010, United Kingdom (47 pages).

Thompson Friction Welding, "Linear Friction Welding Becomes a Commercial Reality", Article, West Midlands, United Kingdom (5 pages), Feb. 2008.

TWI Knowledge Summary website page "Linear friction welding"; by Philip Threadgill, http://www.twi.co.uk/content/ksplt001.html; published at least as early as Oct. 21, 2009; (3 pages).

* cited by examiner

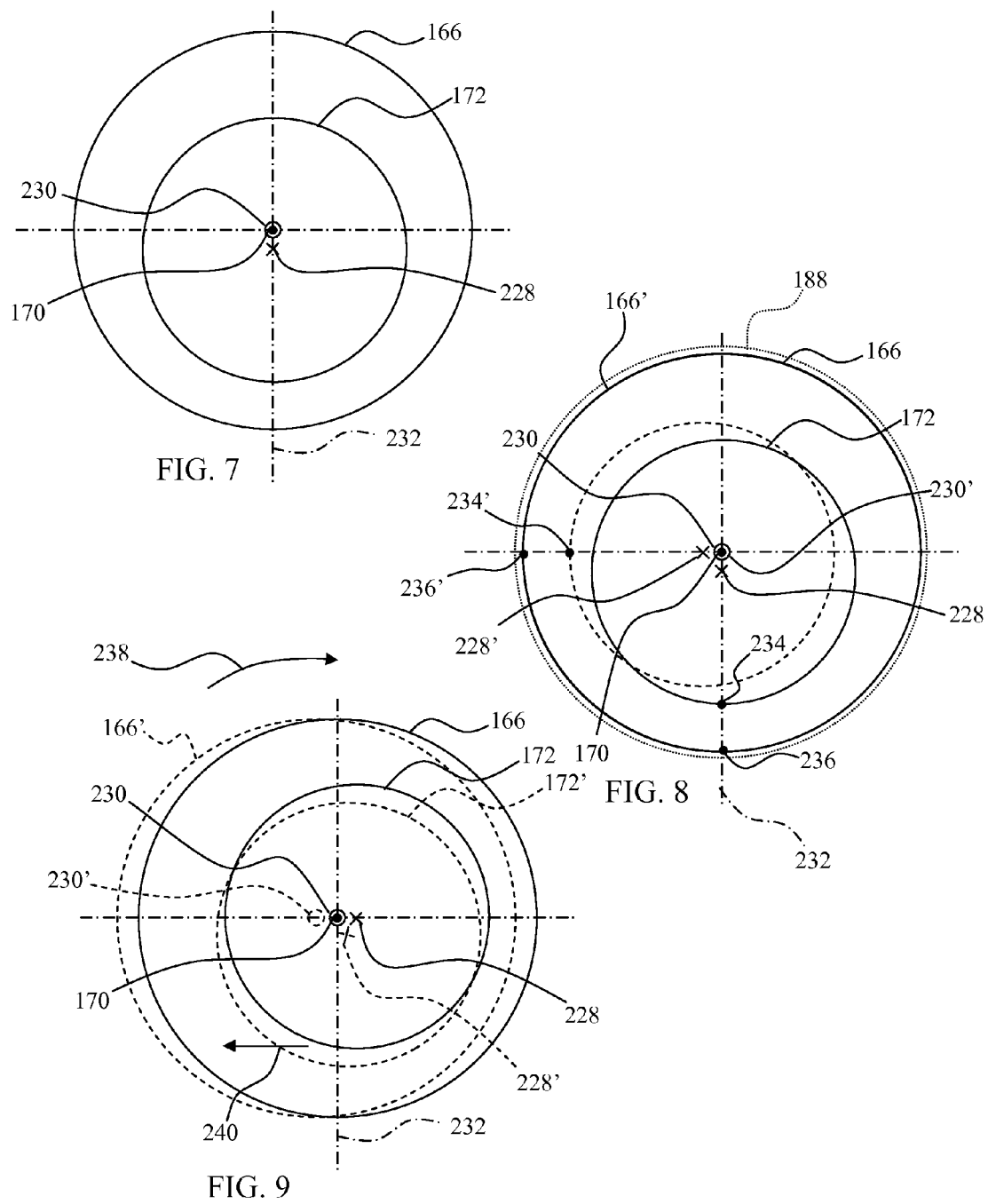

LINEAR FRICTION WELDER

FIELD OF THE INVENTION

The present invention relates to linear friction welding.

BACKGROUND OF THE INVENTION

Friction welding (FW) is a process of joining two components which may be made from the same or different materials. The FW process typically involves pressing one of the two components against the other component with a large amount of force and rapidly moving one of the two components with respect to the other component to generate friction at the interface of the two components. The pressure and movement generate sufficient heat to cause the components to begin to plasticize. Once the two components are plasticized at the contact interface, the relative movement of the two components is terminated and an increased force is applied. As the components cool in this static condition, a weld is formed at the contact interface.

The weld obtained using FW is a solid state bond which is highly repeatable and easily verifiable. For example, the amount of material donated by each component to the formation of the weld, which is referred to as "upset", is well defined. Therefore, by carefully controlling the energy input into the FW system in the form of friction and forging pressure, the measured upset of a welded assembly provides verification as to the nature of the weld obtained.

As discussed above, relative movement of the two components is a critical facet of FW. Different approaches have been developed to provide the required relative movement. One widely used approach is rotational friction welding (RFW). RFW involves rotation of one component about a weld axis. RFW provides many benefits and is thus a favored welding approach in various industries including aerospace and energy industries.

RFW, however, does have some limitations. For example, in forming a weld, the interface between the two components must be evenly heated to generate a uniform plasticity within each of the components throughout the weld interface. If one area becomes hotter than another area, the material in that hotter area will be softer, resulting in an incongruity in the formed weld. To provide consistent heat generation throughout the component interface, the rotated component is necessarily uniformly shaped about the axis of rotation, i.e., circular. Moreover, since the heat generated is a function of the relative speed between the two materials, more heat will be generated toward the periphery of the rotated component since the relative speed at the periphery is higher than the relative speed at the rotational axis.

In response to the limitations of RFW, linear friction welding (LFW) was developed. In LFW, the relative movement is modified from a rotational movement to a vibratory movement along a welding axis. By controlling the amplitude and the frequency of the linear movement, the heat generated at the component interface can be controlled.

LFW thus allows for welding of a component that exhibits substantially uniform width. LFW, like RFW, is subject to various limitations. One such limitation is that LFW exhibits non-uniform heating along the welding axis due to the linear movement of the vibrated component. For example, when welding two components of identical length along the welding axis, the two components are aligned in the desired as-welded position. Due to the nature of previous LFW systems, this location corresponds to the rearmost position of the component which is moved. The leading edge of the vibrated component is then moved beyond the corresponding edge of the stationary component by a distance equal to the amplitude of the vibration. Moreover, the trailing edge of the vibrated component exposes a portion of the stationary component as the leading edge of the vibrated component moves beyond the corresponding edge of the stationary component. Accordingly, the portion of the vibrating component that moves beyond the corresponding edge of the stationary component and the exposed portion of the stationary component will not be heated at the same rate as the remaining surfaces at the component interface. Therefore, manufacturing process must take the incongruity of the welds into account such as by machining off a portion of the welded components at the leading edge and the trailing edge of the formed weld.

Moreover, in order to achieve the frequency and amplitude necessary to realize a weld, a LFW device must provide for rapid acceleration from a dead stop. The moving component must then be completely stopped and reaccelerated in a reverse direction. As the size of the vibrated component increases, the momentum that must be controlled becomes problematic. Thus, traditional LFW devices incorporate massive components which are very expensive.

A related limitation of LFW processes is that the relative motion between the two components must be terminated in order for the weld to form properly. Merely removing the motive force does not remove the momentum of the vibrated component. Additionally, any "rebound" or damped vibrations of the moving component as it is immobilized weakens the final weld since the plasticized metals begin to cool as soon as the vibrating movement is reduced.

One approach to solving the need to rapidly immobilize the moving component is to jam the motion-inducing system such as by forcibly inserting a device into the motion inducing system. Freezing the system in this fashion can provide the desired stopping time. This approach, however, results in significant forces being transmitted through the system, necessitating oversized components to be able to withstand the shock. Moreover, the exact position of the vibrated component with respect to the stationary component is not known. Therefore, manufacturing processes must account for a possible position error potentially equal to the amplitude of vibration.

Therefore, a LFW system and method which provides consistent welds is beneficial. A LFW system and method which allows for smaller components within the system would be beneficial. A LFW system and method which reduce the errors associated with the LFW process would be further beneficial.

SUMMARY OF THE INVENTION

The present invention in one embodiment is directed to a linear friction welding system including a ram configured to vibrate along a welding axis, a cam follower operably connected to the ram, an eccentric including an eccentric outer periphery operably engaged with the cam follower, and an inner periphery, a first power shaft slidingly engaged with the eccentric, and a second power shaft eccentrically engaged with the inner periphery.

In another embodiment, a linear friction welding system includes a ram configured to vibrate along a welding axis, a first power shaft operably connected to the ram and associated with a first eccentricity, a second power shaft operably connected to the ram and associated with a second eccentricity, a memory including program instructions, and a controller operably connected to the memory, and configured to execute the program instructions to control the phased relationship between the first eccentricity and the second eccentricity such that the ram does not vibrate along the welding axis, establish a first pressure between two components to be welded after controlling the phased relationship such that the ram does not vibrate, and modify the phased relationship such that the ram vibrates along the welding axis after the first pressure has been established.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangement of system and method components. The drawings are only for purposes of illustrating exemplary embodiments and are not to be construed as limiting the invention.

FIG. 7 depicts a system phase angle diagram with the geometric center of the inner power shaft offset from the axis of rotation of the inner and outer power shafts to form an eccentric portion of the inner power shaft and the geometric center of the eccentric aligned with the axis of rotation of the inner and outer power shafts;

FIG. 8 depicts the area circumscribed by the eccentric for a complete rotation of the inner and outer power shaft with respect to the area defined by the inner periphery of the cam follower of the linear friction welding system of FIG. 1 when the system phase angle is set to zero and the cam follower is at a neutral location;

FIG. 9 depicts the movement of the eccentric when the phase between the inner and the outer power shafts is modified from the matched phase of FIG. 8;

DESCRIPTION

Figure 1:
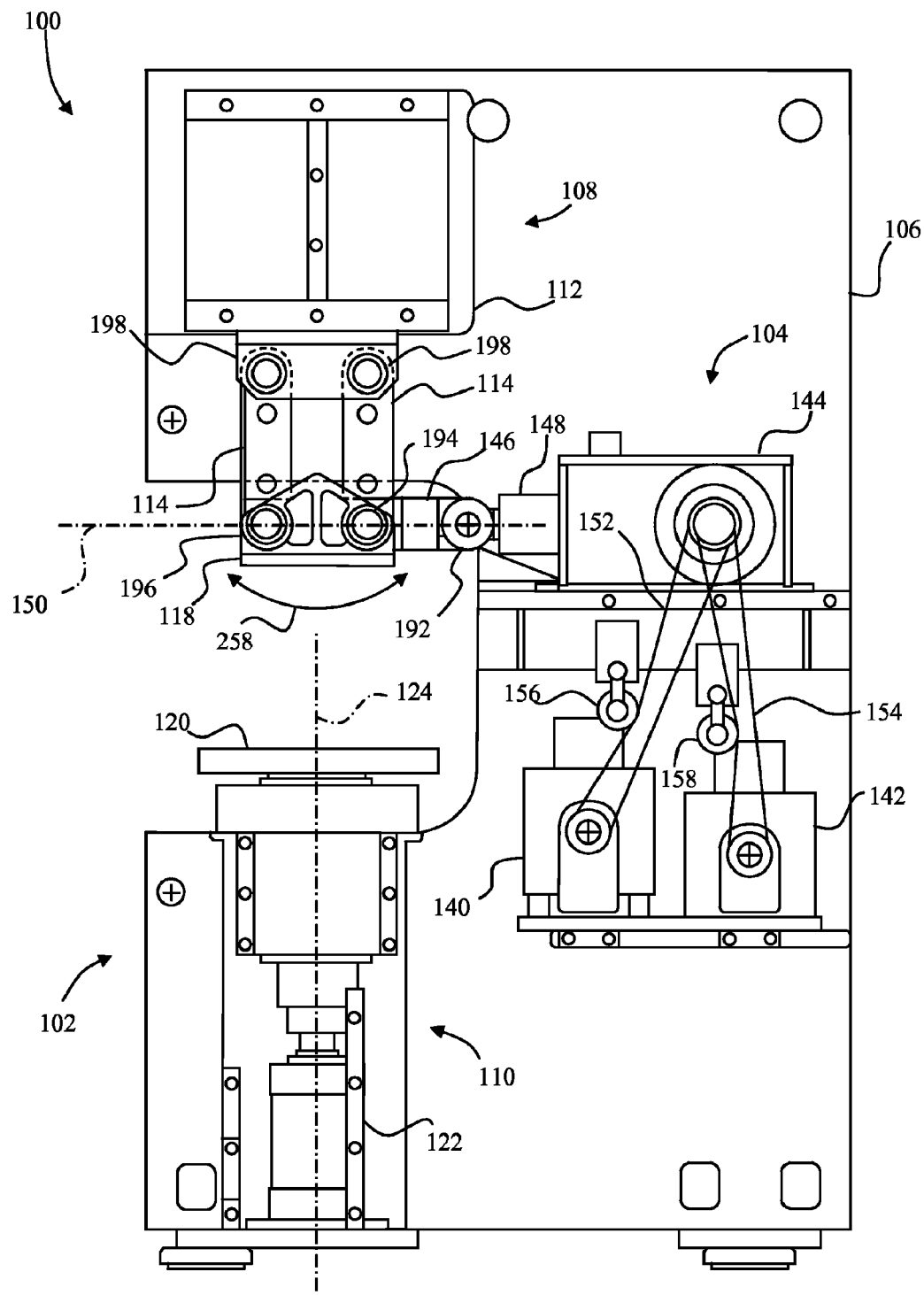
FIG. 1 depicts a partial side cutaway plan view of a linear friction welding system in accordance with principles of the invention.

Referring to FIG. 1, a linear friction welding system 100 includes a pressing assembly 102 and a vibrating assembly 104 positioned within a frame 106. The pressing assembly 102 includes an upper assembly 108 and a lower assembly 110. The upper assembly includes a base 112 and two rocker arm pairs 114 and 116 supporting a carriage 118 as further shown in FIG. 2.

Figure 2:
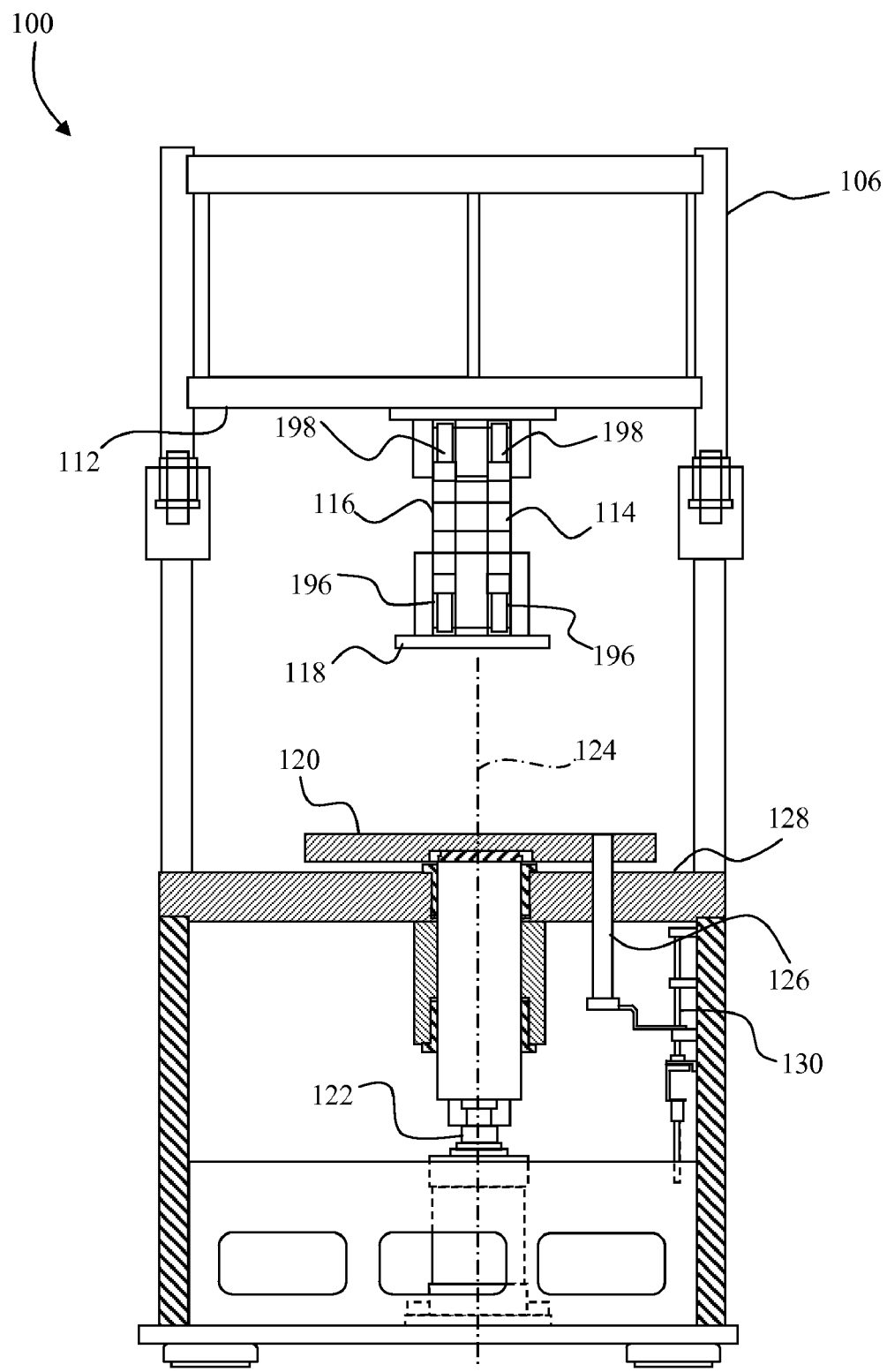
FIG. 2 depicts a partial front cross-sectional view of the system of FIG. 1.

Continuing with FIG. 2, the lower assembly 110 is generally aligned with the carriage 118 and includes a forge platen 120 supported above a main hydraulic press 122. The main hydraulic press 122 defines a press axis 124. An anti-rotation rod 126 extends from the forge platen 120 through a lower support plate 128. A sensor 130 is associated with the anti-rotation rod 126. In one embodiment, the sensor 130 is a linear voltage displacement transducer (LVDT).

Returning to FIG. 1, the vibrating assembly 104 includes two motors 140 and 142, a cam assembly 144, and a ram 146. The ram 146 is rigidly connected to the carriage 118 at a forward end and is pivotally connected to the cam assembly 144 at the opposite end through a connecting rod 148. The ram 146 is configured for movement along a weld axis 150. The motor 140 is connected to the cam assembly 144 through a belt 152 while the motor 142 is connected to the cam assembly 144 through a belt 154. Belt tensioners 156 and 158 are used to establish timing between the motors 140 and 142, respectively.

Figure 3:
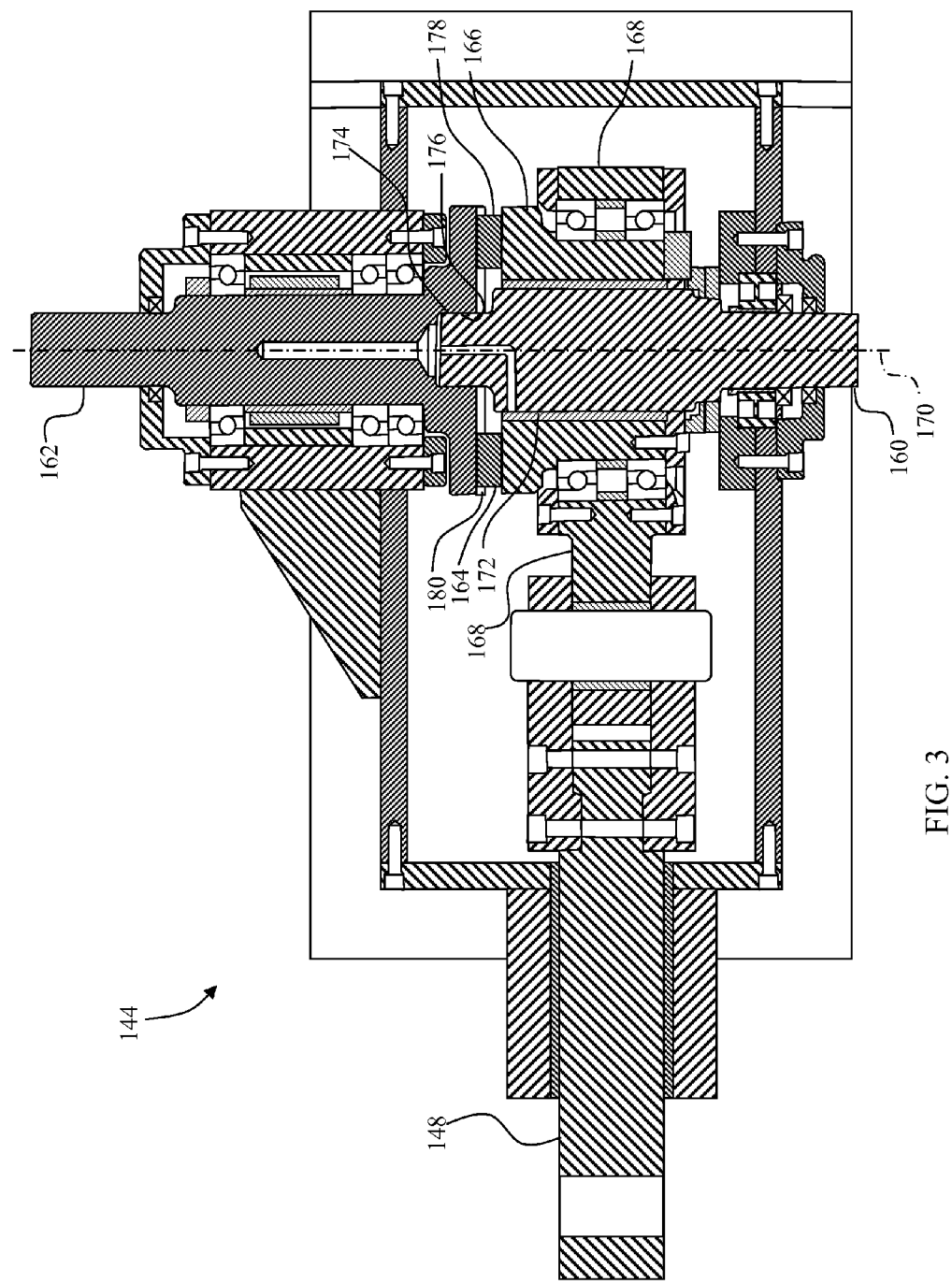
FIG. 3 depicts a top cross-sectional view of the vibrating system of the linear friction welding system of FIG. 1 depicting an eccentric portion of an inner power shaft positioned within an eccentric, with an eccentric outer surface and an outer power shaft engaged with the eccentric.
Figure 4:
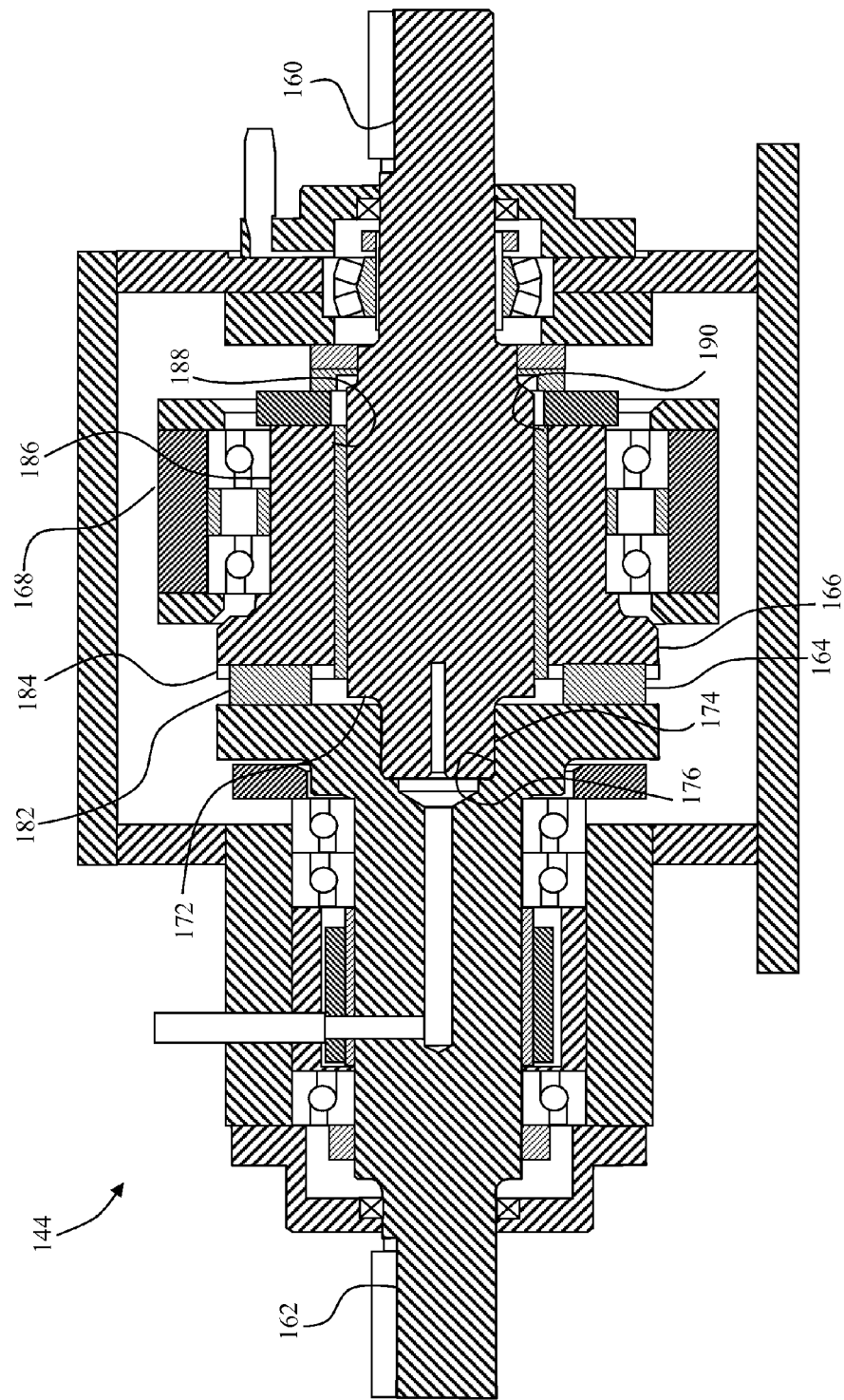
FIG. 4 depicts a front cross-sectional view of the vibrating system of FIG. 3.

The cam assembly 144, shown in more detail in FIGS. 3-4, includes an inner power shaft 160, an outer power shaft 162, a coupler 164, an eccentric 166, and a cam follower 168. The inner power shaft 160 is coupled with the motor 142 through the belt 154 and rotates about an axis of rotation 170. The inner power shaft 160 includes an eccentric portion 172 and a projection 174. The outer power shaft 162 is coupled with the motor 140 through the belt 152 and also rotates about the axis of rotation 170. The outer power shaft 162 includes a cavity 176 configured to rotatably receive the projection 174. Rotatable engagement of the projection 174 within the cavity 176 keeps both the inner and outer power shafts 160/162 coaxial with the axis of rotation 170.

The coupler 164 is a modified Oldham coupler including one bifurcated tongue 178 which mates with a groove 180 in the outer power shaft 162 (see FIG. 3) and a second bifurcated tongue 182, rotated ninety degrees with respect to the bifurcated tongue 178, which mates with a groove 184 in the eccentric 166 (see FIG. 4). The eccentric 166 further includes an outer eccentric periphery 186 and an inner periphery 188 defining a through-bore 190. The bore 190 is sized to rotationally receive the eccentric portion 172 of the inner power shaft 160. The outer eccentric periphery 186 defines a diameter that is closely fit within the inner diameter of the cam follower 168.

The connecting rod 148 of the cam assembly 144 is pivotably connected to the ram 146 through a pivot 192 (see FIG. 1). The ram 146 is in turn pivotably connected to the carriage 118 through a lower pivot pair 194 (only one is shown). The lower pivot pair 194 also pivotably connects the carriage 118 with a rearward rocker arm of each of the rocker arm pairs 114 and 116. Another lower pivot pair 196 shown in FIG. 1 pivotably connects the carriage 118 with a forward rocker arm of each of the rocker arm pairs 114 and 116. Four pivots 198 pivotably connect each of the rocker arms in the rocker arm pairs 114 and 116 to the base 112.

Figure 5:
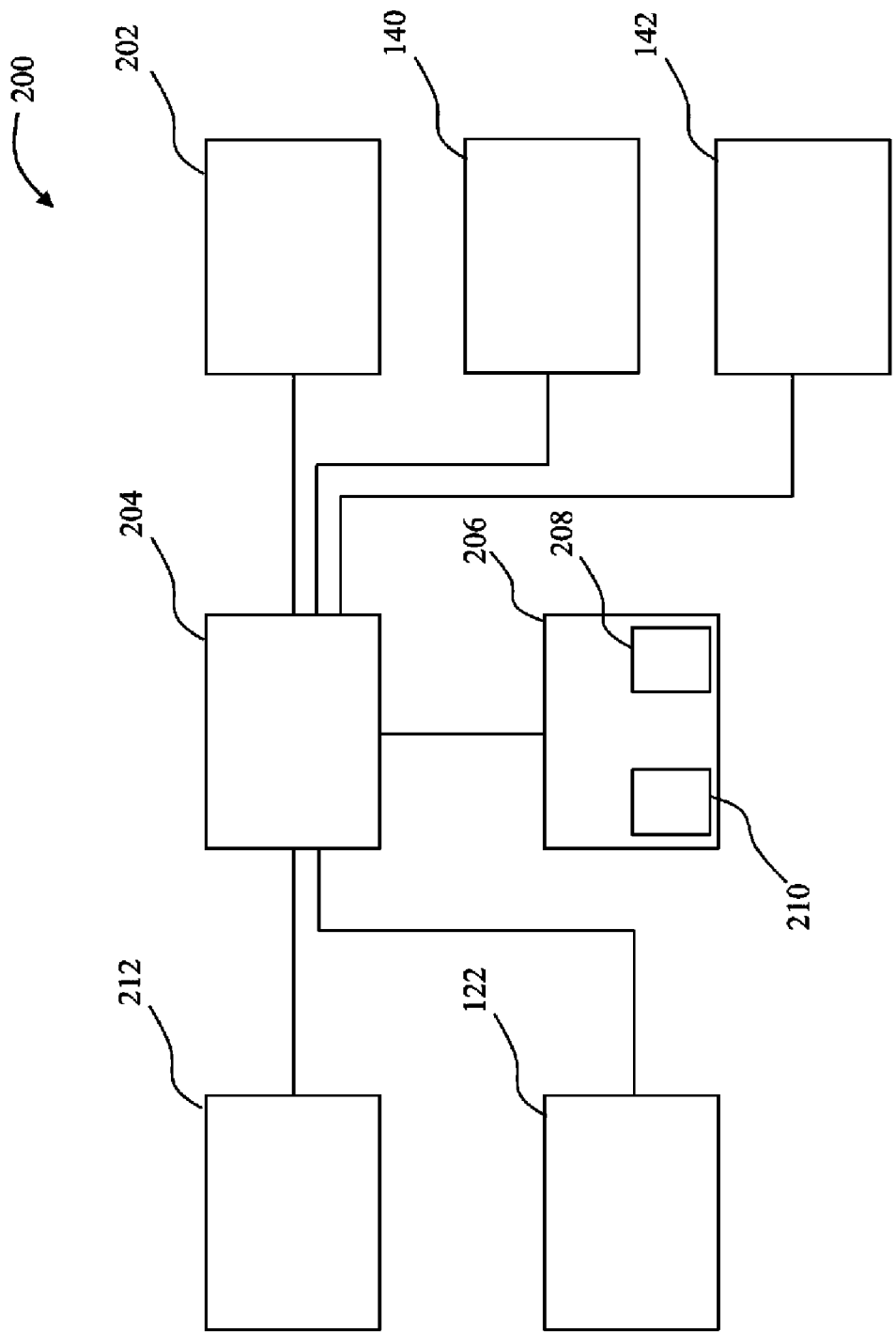
FIG. 5 depicts the control system of the linear friction welding system of FIG. 1.

The linear friction welding system 100 is operated under the control of a welding control system 200 depicted in FIG. 5. The control system 200 includes an I/O device 202, a processing circuit 204 and a memory 206. The control system 200 is operably connected to the main hydraulic press 122, the motors 140 and 142, and a sensor suite 212. If desired, one or more of the components of the system 200 may be provided as a separate device which may be remotely located from the other components of the system 200.

The I/O device 202 may include a user interface, graphical user interface, keyboards, pointing devices, remote and/or local communication links, displays, and other devices that allow externally generated information to be provided to the control system 200, and that allow internal information of the control system 200 to be communicated externally.

The processing circuit 204 may suitably be a general purpose computer processing circuit such as a microprocessor and its associated circuitry. The processing circuit 204 is operable to carry out the operations attributed to it herein.

Within the memory 206 are various program instructions 208. The program instructions 208, some of which are described more fully below, are executable by the processing circuit 204 and/or any other components of the control system 200 as appropriate. Parameter databases 210 are also located within the memory 206.

Figure 6:
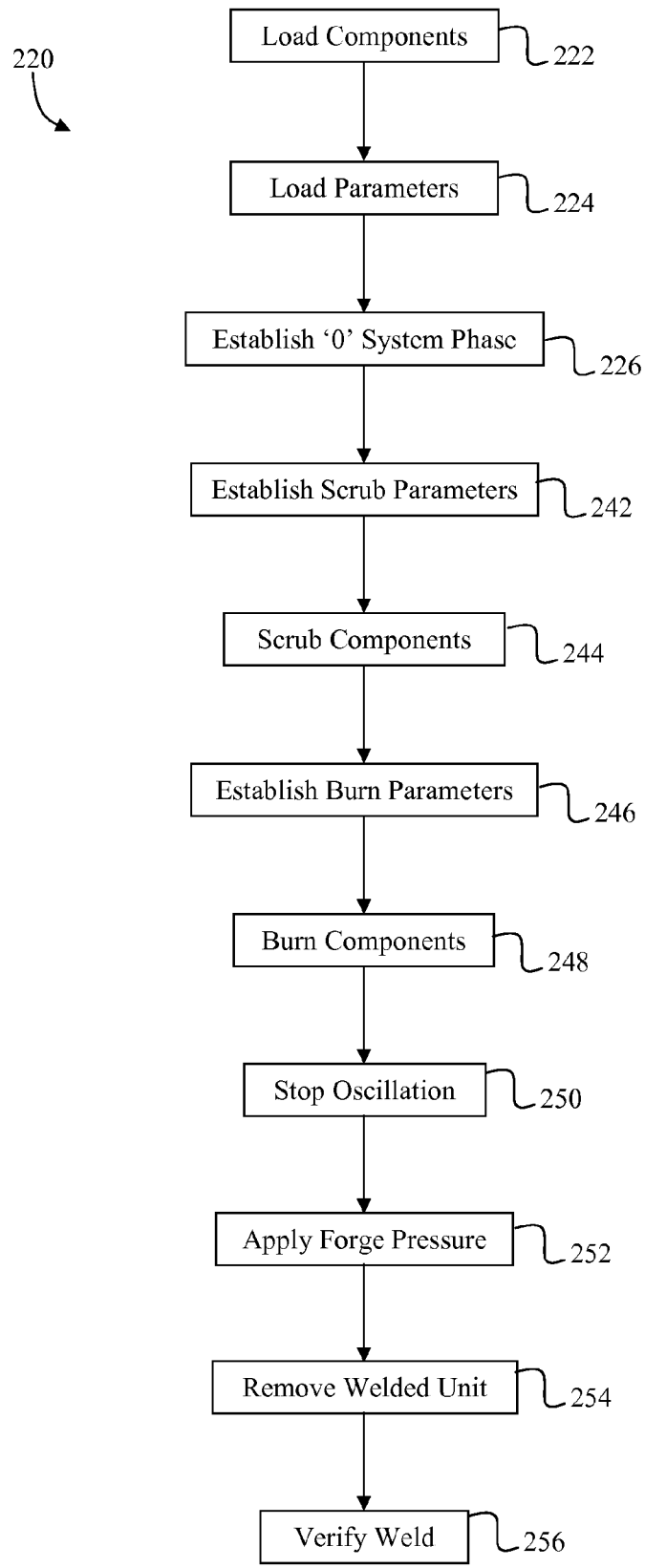
FIG. 6 depicts a procedure that can be executed under the control of the control system of FIG. 5 to form a welded unit with the linear friction welding system of FIG. 1.

Further details regarding the control system 200 and the linear friction welding system 100 are provided with reference to the procedure 220 of FIG. 6. The processing circuit 204 executes the program instructions 208 to execute at least some of the procedure 220 of FIG. 6. In different embodiments, the procedure 220 may be modified to include more or fewer steps depending upon the specific criterion.

At block 222 of FIG. 6, the components which are to be welded are loaded into the linear friction welding system 100. One of the components is positioned on the forge platen 120 while the other component is positioned on the carriage 118. The control parameters are loaded into the parameter databases 210 at block 224. Parameters which may be loaded include scrub parameters, burn parameters, and forging parameters, each of which is further described below.

At block 226, the system phase angle of the linear friction welding system 100 is established at a "0" system phase angle. The "system phase angle" is described with reference to FIG. 7. FIG. 7 is a schematic diagram of the eccentric portion 172 of the inner power shaft 160 and the eccentric 166. The geometric center 228 of the eccentric portion 172 (indicated by an "X") is offset from the axis of rotation 170 of the inner power shaft 160 and the outer power shaft 162. The geometric center 230 of the eccentric 166 (indicated by an "O") is in turn offset from the geometric center 228 and, in the configuration of FIG. 7, located on the axis of rotation 170.

While the inner power shaft 160 and the outer power shaft 162 both rotate about the axis of rotation 170, the "system phase angle" as that term is used herein is defined as the angular location of the geometric center 230 with respect to the location of the geometric center 228 as depicted in FIG. 7.

In FIG. 7, the geometric center 228 is located below the axis of rotation 170 and on the vertical axis 232 which extends through the axis of rotation 170. Thus, if the outer eccentric 166 is rotated ninety degrees in a clockwise direction from the position depicted in FIG. 7, the geometric center 230 would be rotated ninety degrees about the geometric center 228 to a location directly to the right of the geometric center 228 on a horizontal axis running through the geometric center 228. Thus, a system phase angle of "0" is depicted by the location of the geometric center 230 in FIG. 7. When the system phase angle is at "0" degrees, the relative phase between the inner power shaft 160 and the outer power shaft 162 is "matched."

A system phase angle of zero may be established using stored position information of the inner power shaft 160 and the outer power shaft 162. The system phase angle is then verified by rotating the inner power shaft 160 and the outer power shaft 162 at a low speed. Once the inner power shaft 160 and the outer power shaft 162 are rotating, the processing circuit 204, using one or more sensors from the sensor suite 212, monitors the ram 146 for movement. In one embodiment, the sensor suite 212 includes an LVDT positioned to monitor movement of the ram 146. When the relative phase of the inner power shaft 160 and the outer power shaft 162 is matched, the ram 146 is motionless as explained with reference to FIG. 8.

In FIG. 8, the position of the eccentric portion 172 and the eccentric 166 in FIG. 7 is shown. Reference points 234 and 236 indicate a location on the outer periphery of the eccentric portion 172 and the eccentric 166, respectively, which lies on the vertical axis 232. FIG. 8 further depicts the position of the eccentric portion 172 and the eccentric 166 after the inner and outer power shafts 160 and 162 have been rotated by one quarter turn in the clockwise direction. The position of the eccentric portion 172 and the eccentric 166 after rotation is identified as eccentric portion 172' and the eccentric 166'. Additionally, the position of the points 234 and 236 after rotation is identified as points 234' and 236'. Also depicted in FIG. 8 is the area circumscribed by the inner periphery 188 of the cam follower 168 when the cam follower 168 is in a neutral position. The cam follower in FIG. 8 is depicted as spaced apart from the eccentric 166 for purpose of clarity. The two components are typically in contact about their respective inner and outer peripheries.

FIG. 8 shows that when the inner power shaft 160 and the outer power shaft 162 are matched in relative phase (zero system phase angle), the eccentric portion 172 and the eccentric 166 rotate within the inner periphery 188 of the cam follower 168 without extending beyond the area defined by the inner periphery 188 when the cam follower 168 is in the neutral position. Therefore, the eccentric 166 does not force the cam follower 168 out of the neutral position. Consequently, the connecting rod 148 does not move and the ram 146 remains motionless in a mid-stroke position. To ensure that all movement is terminated once a "0" degree system phase angle is established, the dimensions of the eccentric portion 172 and the eccentric 166 should be matched as precisely as possible. Accordingly, the eccentric portion 172 and the eccentric 166 may be manufactured and provided as a matched set.

If the processing circuit 204 determines that the ram 146 is moving, the speed of one or more of the motors 140 and 142 is modified to modify the relative phase of the inner and outer power shafts 160 and 162 to bring the system phase angle to '0'. Relative phase modification between the inner and outer power shafts 160 and 162 is further discussed in reference to FIG. 9. In FIG. 9, the relative phase of the inner and outer power shafts 160 and 162 is initially matched with both power shafts 160/162 rotating in the direction of the arrow 238.

Thus, the geometric center 230 of the eccentric 166 is centered on the axis of rotation 170. By accelerating the motor 142 with respect to the speed of the motor 140, the rotation of the inner power shaft 160 is increased. The increased rotational speed of the inner power shaft 160 results in a relative movement of the inner power shaft 160 with respect to the outer power shaft 162 in the direction of the arrow 240.

Since the geometric center 228 of the eccentric portion 172 is to the right of the vertical axis 232 as depicted in FIG. 9, the portion of the eccentric portion 172 located to the right of the vertical axis 232 is longer than the portion of the eccentric portion 172 located to the left of the vertical axis 232. Thus, as the inner power shaft 160 rotates in the direction of the arrow 238 with respect to the outer power shaft 162, the longer portion of the eccentric portion 172 is rotated about the axis of rotation 170 in the direction of the arrow 238. This results in a force on the eccentric 166 in the direction of the arrow 240. Precise relative positioning of the inner power shaft 160 outer power shaft 162 during this process is ensured because the projection 174 of the inner power shaft 160 is rotatably supported within the cavity 176 of the outer power shaft 162.

The eccentric 166 is slidingly engaged with the outer power shaft 162 through the coupler 164. More specifically, the groove portion 184 of the eccentric 166 is slidingly engaged with the bifurcated tongue 182 of the coupler 164 (see FIG. 4) while the bifurcated tongue 178 of the coupler 164 is slidingly engaged with the groove 180 in the outer power shaft 162 (see FIG. 3). Accordingly, when force is applied in the direction of the arrow 240, the eccentric 166 slides in the direction of the arrow 240 to the location indicated by eccentric 166'. Movement of the eccentric 166 to the location indicated by the eccentric 166' allows the eccentric portion 172 to rotate about the axis of rotation 170 to the location indicated by the eccentric portion 172'. Accordingly, the geometric center 228 is rotated to the location indicated by the geometric center 228'.

Similarly, slowing the motor 142 with respect to the speed of the motor 140 causes relative rotation of the geometric center 228 in a counterclockwise direction. Thus, the relative phase of the inner and outer power shafts 160/162 can be modified by controlling the relative speed of the motors 140 and 142. Because the rotational positions of the output shafts (not shown) of the motors 140 and 142 are directly related to rotational positions of the inner and outer power shafts 160/162 in this embodiment, reference may be alternatively made herein to "phasing" of the motors 140 and 142 or of the inner and outer power shafts 160/162. Once the desired phasing is achieved, the speed of the motors 140 and 142 is matched to maintain the desired phasing.

Returning to the procedure 220 of FIG. 6, once the system phase angle is established at zero degrees at block 226, scrub parameters are established at block 242. Scrub parameters are established under the control of the processing circuit 204 which controls the main hydraulic press 122 to raise the weld component mounted on the forge platen 120 into contact with the weld component mounted on the carriage 118. By monitoring the pressure of the hydraulic press 122, and/or using other sensory inputs, the processing circuit 204 determines when the two weld components are brought into contact. If the contact happens at a travel location of the forge platen 120 that is not expected, a user warning may be issued.

Once the components to be welded are in contact, the initial positions of the two weld components are stored, such as by storing the output of the sensor 130, and the processing circuit 204 controls the main hydraulic press 122 to achieve a desired scrub pressure based upon a value stored in the parameters database 210. The processing circuit 204 further obtains a scrub frequency from the parameters database 210 and controls the speed of the motors 140 and 142 to a speed corresponding to the desired scrub frequency. In embodiments wherein frequency is modified before modification of the system phase angle, the motors at this point in the procedure will be rotating at a speed associated with the scrub frequency while the ram 146 remains motionless. The processing circuit 204 then controls the speed of one or both of the motors 140/142 to modify the relative phase of the inner/outer power shafts 160/162 to obtain a desired scrub amplitude of the ram 146 in accordance with a scrub amplitude parameter stored in the parameter database 210.

Figure 10:
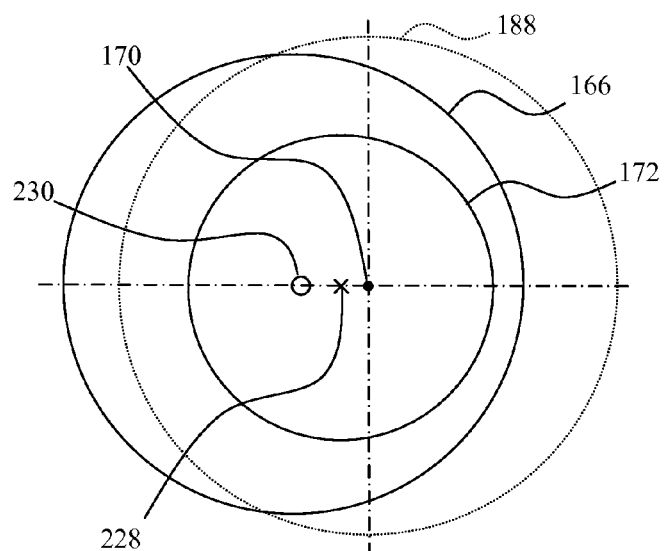
FIG. 10 depicts the location of the eccentric when the eccentricities of the inner power shaft and the eccentric are aligned with respect to the inner periphery of the cam follower of the linear friction welding system of FIG. 1 when the cam follower is at the neutral position.

As discussed above with respect to FIG. 7, modification of the relative phase between the inner and outer power shafts 160/162 results in sliding of the eccentric 166 with respect to the outer power shaft 162. The resulting displacement of the eccentric 166 with respect to the cam follower 168 is depicted in FIG. 10. In FIG. 10, the eccentric 166 is displaced to a location that is farther to the left than the location of the inner periphery 188 of the cam follower 168 when the cam follower 168 is in the neutral position. Accordingly, the outer eccentric periphery 186 of the eccentric 166 is forced against the inner periphery 188, thereby forcing the cam follower 168 to rotate as the inner and outer power shafts 160 and 162 rotate. The end of the connecting rod 148 which is coupled to the cam follower 168 is thus forced to follow the movement of the cam follower 168. The coupler rod 148 translates the movement of the coupler receiving end to a linear oscillating movement along the weld axis 150 at the end of the connecting rod 148 coupled with the ram 146.

The total amplitude of the linear oscillating movement or stroke of the ram 146 is a function of the relative phase of the inner and outer power shafts 160/162 along with the offset between the axis of rotation 170 and the geometric center 228 of the eccentric portion 172 and the offset between the geometric center 228 of the eccentric portion 172 and the geometric center 230 of the eccentric 166. By way of example, if a maximum amplitude of 6 mm is desired for a particular system, then the offset between the axis of rotation 170 and the geometric center 228 of the eccentric portion 172, and the offset between the geometric center 228 of the eccentric portion 172 and the geometric center 230 of the eccentric 166 can be established at 1.5 mm. When the relative phase of the inner and outer power shafts 160/162 is matched, the offsets are 180 degrees out of phase and cancel each other resulting in no movement of the ram 146 as described above.

Figure 11:
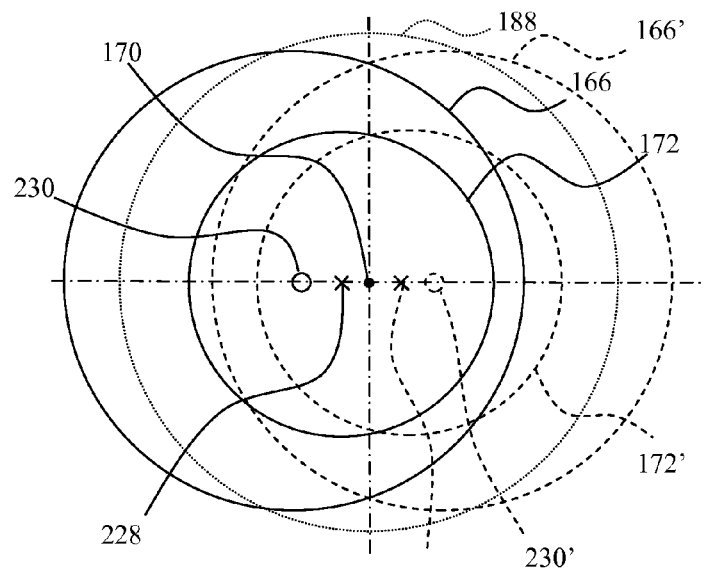
FIG. 11 depicts the area circumscribed by the eccentric for a complete rotation of the inner and outer power shaft with respect to the area defined by the inner periphery of the cam follower of the linear friction welding system of FIG. 1 when the eccentricities of the inner power shaft and the eccentric are aligned and the cam follower is at the neutral location.

When the relative phase of the inner and outer power shafts 160/162 is modified to align the eccentricities of the eccentric portion 172 and the eccentric 166 as shown in FIG. 10, the ram 146 is moved away from its neutral position by the combined offsets, or 3 mm to the left. As shown in FIG. 11, as the inner and outer power shafts 160/162 rotate, the offsets of the inner and outer power shafts 160/162 are rotated to extend to the right. Thus, the ram 146 is moved to a location 3 mm to the right of its neutral position, giving a total amplitude of 6 mm. Accordingly, the ram 146 moves from its neutral or initial position by only ½ of the selected amplitude.

Amplitudes between 0 and 6 mm can be obtained by selecting an appropriate relative phase between the inner and outer power shafts 160/162. As noted above, a relative phase angle of 180 degrees between the inner and outer power shafts 160/162 corresponds to a system phase angle of zero. Additionally, the relationship between the system phase angle and the amplitude of oscillation of the ram 146 is a function of the law of cosines. The relationship between the system phase angle and the amplitude of oscillation of the ram 146 is defined by the following System Phase Angle equation:

$$\theta = 2\sin^{-1}\left(\frac{n}{2x_o}\right)$$

wherein

θ is the system phase angle, n is one half of the desired amplitude, and $x_o$ is the offset both between the axis of rotation 168 and the geometric center 228 of the eccentric portion 172 and between the geometric center 228 of the eccentric portion 172 and the geometric center 230 of the eccentric 166.

Once the scrub pressure, scrub frequency, and scrub amplitude have been established, a scrub timer is started and counted down using a system clock or other appropriate clock. As the scrub is performed, a "wiping action" is generated by the linear friction welding system 100. The wiping action is a result of the incorporation in the linear friction welding system 100 of the rocker arm pairs 114 and 116 and the pivotable connections between the ram 146, the carriage 118, the rocker arm pairs 114 and 116, and the base 112. As the ram 146 oscillates along the weld axis 150, the carriage 118 "swings" on the rocker arm pairs 114 and 116 as indicated by the arrow 258 of FIG. 1. The vertical position of the carriage 118 thus varies as a function of the length of the rocker arm pairs 114 and 116 and the amplitude of the scrub oscillation.

The cyclical variation in the height of the carriage 118 generates a cyclical variation in the pressure between the welding components. For example, when the ram 146 is at the middle location of the stroke, the carriage 118 is at its lowest vertical position. As the ram 146 oscillates, the carriage 118 swings along the arc defined by the rocker arm pairs 114 and 116. Accordingly, the carriage 118 moves upwardly from the lowest vertical position, thereby relieving some of the pressure between the weld components as the ram 146 moves forwardly or backwardly from the mid-stroke position. Of course, this pressure variation could be removed by increasing the reaction speed of the main hydraulic press and/or increasing the sensitivity of the pressure control associated with positioning of the main hydraulic press 122. Maintaining some amount of wiping action, however, is desired in order to increase the efficiency of the system.

Specifically, as two weld components are scrubbed, relative linear movement of the weld components is used to generate heat in the weld components because of friction between the weld components. As the temperature of the weld components increases, one or both of the components begins to plasticize at the weld interface. The plasticized material acts like a liquid, allowing the opposing surface to hydroplane on the plasticized surface. The reduced friction which results when the two surfaces are hydroplaning reduces the conversion of linear movement into heat.

Accordingly, for a given amount of linear movement, the resulting heat energy transferred to the two weld components is reduced when hydroplaning is occurring. The cyclical variation in pressure resulting from the wiping action of the linear friction welding system 100, however, disrupts the plasticized layer between the weld components, reducing the hydroplaning effect and increasing the conversion of linear movement into heat. Depending upon the particular dimensions of the linear friction welding system 100 and the materials being welded, 10-25 percent less energy may be used to perform a particular scrub when wiping action as described herein is provided. Moreover, the uniformity of the energy transfer is increased along the weld component interface, resulting in a more consistent weld.

When the desired scrub has been performed at block 244, burn parameters are established in the linear friction welding system 100 at block 246. Specifically, the processing circuit 204 controls the main hydraulic press 122 to achieve a desired burn pressure based upon a value stored in the parameters database 210. The processing circuit 204 further obtains a burn frequency from the parameters database 210 and controls the speed of the motors 140 and 142 to a speed corresponding to the desired burn frequency. The processing circuit 204 then controls the speed of one or both of the motors 140/142 to modify the relative phase of the inner/outer power shafts 160/162 to obtain a desired burn amplitude based upon burn amplitude data stored in the parameters database 210. In one embodiment, all of the changes from the scrub parameters to the burn parameters are controlled to occur substantially simultaneously.

Once the burn pressure, burn frequency, and burn amplitude have been established, a burn timer is started and counted down using a system clock or other appropriate clock, and a burn is performed at block 248. During the burn, the processing circuit 204 obtains input from the sensor suite 212 and modifies the speed of the motors 140/142 as needed to maintain the desired burn frequency and amplitude and controls the main hydraulic press 122 to maintain the desired burn pressure.

When the burn timer has expired, movement of the ram 146 is terminated at block 250. Movement can be terminated under the control of the processing circuit 204 by adjusting the speed of one or both of the motors 140/142 to obtain a system phase angle of zero. Then while the motors 140/142 rotate with no movement of the ram 146, the processing circuit 204 controls the main hydraulic press 122 to establish a forge pressure at block 252 between the two weld components based upon data stored in the parameters database 210. The forge pressure applied to properly burned components which are not moving with respect to one another welds the two components together into a welded unit.

Once the components have been welded, the welded unit can be removed (block 254) and the weld verified (block 256). If desired, the processing circuit 204 may be used to determine the weld quality. Specifically, at block 240, the initial position of the forge platen 120 as the two weld components came into contact was stored. At the completion of the welding of the two components into a welded unit, the processing circuit 204 may obtain position data from the sensor 130 indicative of the position of the forge platen 120 after a weld has been formed. The difference between the two locations indicates a loss of material from the two components at the contact point of the two components.

Additionally, the temperature of the two components can be established, either by sensory input from the sensor suite 212 and/or by historic knowledge of the effects of the scrub and burn processes on the materials of the two components. Furthermore, the actual pressure, frequency, and amplitude of the procedure 220 provide precise information about the amount of energy placed into the components during the procedure 220. Consequently, the foregoing data may be used to calculate the amount of material lost due to flash and the nature of the weld formed.

The linear welding system 100 thus provides precise and independent control of pressure applied as well as the frequency and amplitude of oscillation during the procedure 220. Accordingly, in addition to modifying the pressure between two components during scrubbing, burning, and forging of two components, the frequency and amplitude of oscillation may also be independently modified between the scrubbing and burning procedures.

Figure 12:
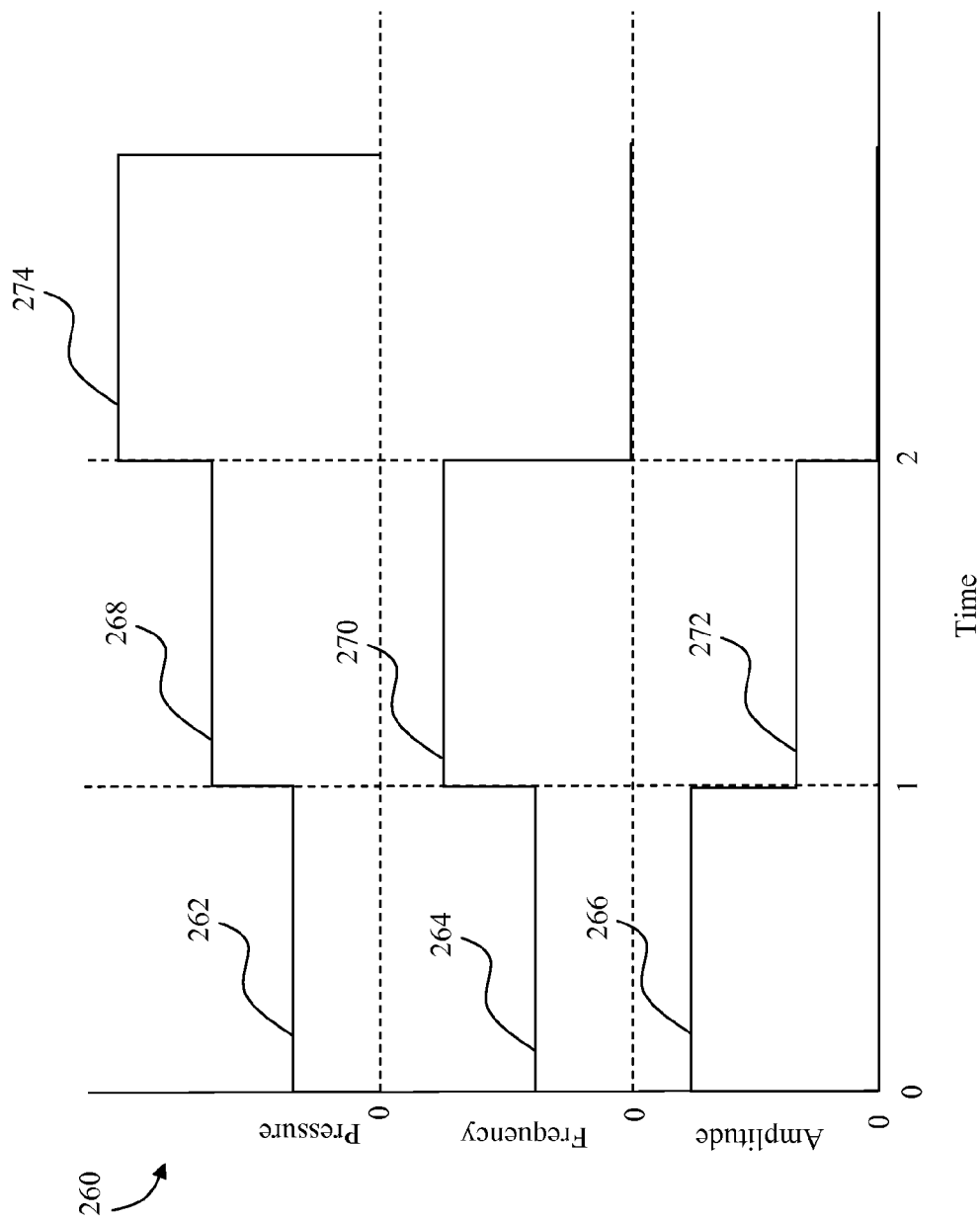
FIG. 12 depicts the parameters for pressure, frequency and amplitude of the linear friction welding system of FIG. 1 for an exemplary scrub, burn, and forge in accordance with the procedure of FIG. 6.

By way of example, FIG. 12 depicts a chart 260 depicting scrubbing, burning, and forging parameters during an exemplary welding process. At T=0, scrub pressure 262, scrub frequency 264, and scrub amplitude 266 are established. For titanium components, the scrub pressure 262 may be about 5,000 pounds per square inch ("psi"), the scrub frequency may be about 20 hertz ("Hz"), and the scrub amplitude 266 may be about 6 millimeters ("mm"). At T=1, which in this example may be after about 2 seconds, the scrub pressure 262 is changed to a burn pressure 268 of about 7,500 psi, the scrub frequency is changed to a burn frequency 270 of about 40 Hz, and the scrub amplitude 266 is changed to a burn amplitude 272 about 4 mm. When the desired conditions have been established at the interface between the two components, then at T=2 the frequency 274 and amplitude of oscillation 276 is established at zero while a forge pressure 278 of about 15,000 psi is established. The two components then form a weld under the forge pressure 278.

Moreover, in addition to the ability to independently control pressure and oscillation frequency and amplitude, the linear friction welding system 100 provides the ability to rapidly and precisely vary the various parameters. In one embodiment wherein the motors 140 and 142 are servo motors nominally rated at 75 horsepower and 6,000 RPM with 2.0 service factor, the movement of the ram 146 following a burning process can be completely stopped within 0.25 seconds and more preferably within 0.1 sec. This level of control is enabled in one embodiment by the provision of encoders on each of the motors 140 and 142.

The encoders are mounted on the output shafts and provide 4,096 counts for a complete rotation of the output shafts of the motors 140 and 142. The output of the encoders is provided to the processing circuit 204 which uses the sensed position of the shafts of the motors 140 and 142 as part of a control loop to finely control servo drivers which independently control the rotation of the motors 140 and 142. The control loop may be executed by the processing circuit 204 up to 1,000 times per second or faster. Accordingly, oscillation of the ram 146 can be modified within 1/1,000 of a second of the determination that ram oscillation is to be modified.

Figure 13:
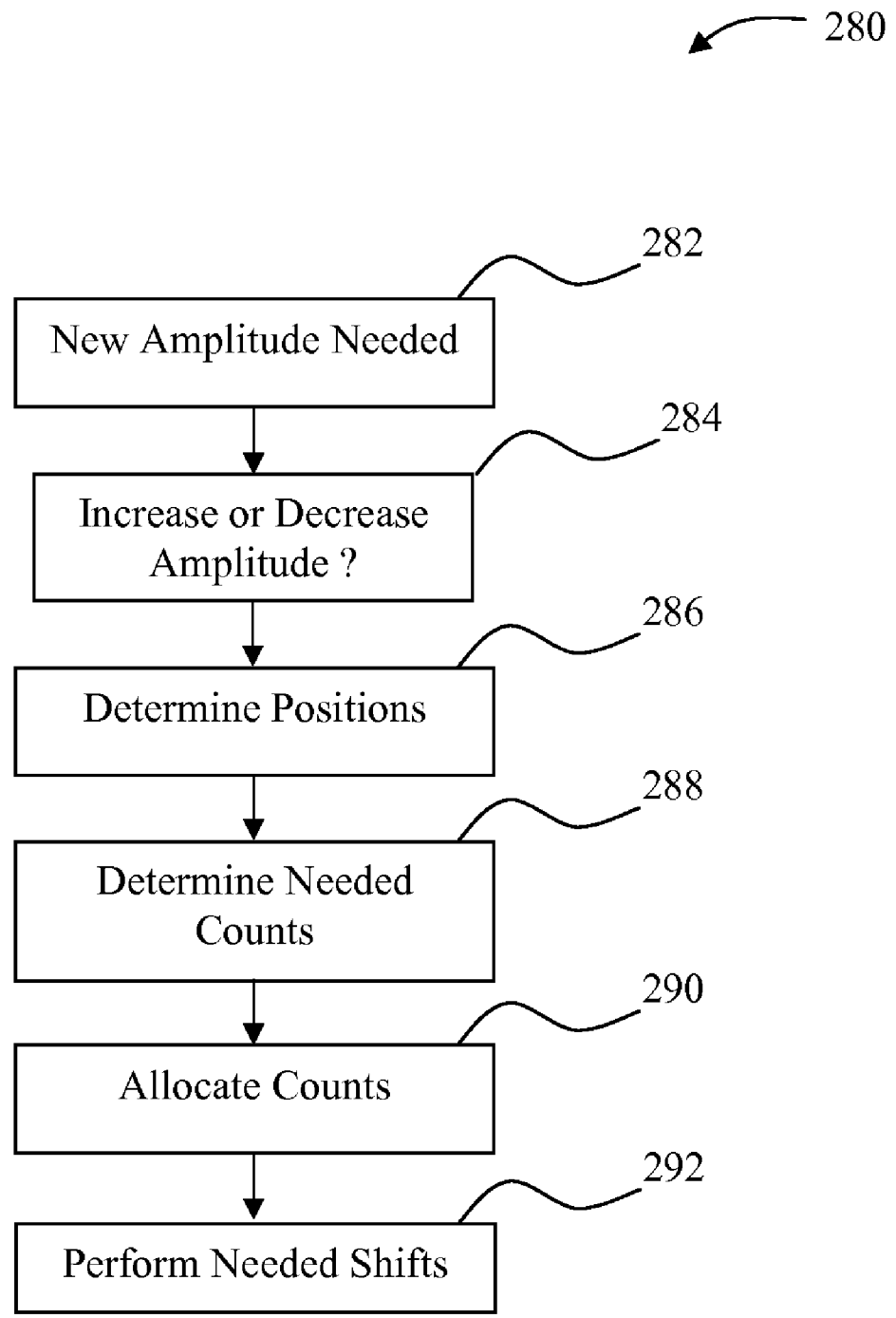
FIG. 13 depicts a procedure that can be executed under the control of the control system of FIG. 5 to modify the relative phase of the inner and outer power shafts.

In the event that the oscillation of the ram 146 is to be modified such as in performing blocks 242, 246, or 250 of the procedure 220, the processing circuit 204 in one embodiment executes the procedure 280 of FIG. 13. At block 282, the processing circuit 204 determines that a new oscillation amplitude is to be established. The new oscillation amplitude may be obtained from the parameters database 210 or may be received from an I/O device 202. In some embodiments, the new oscillation amplitude may be determined by the processing circuit 204 as part of, for example, a feedback loop. The processing circuit 204 may utilize a variety of inputs in calculating the new oscillation amplitude including motor amperage limits, motor amperage readings, position of the ram 146, speed and location of the inner and outer power shafts 160/162, pressure between the weld components, etc.

The processing circuit 204 then determines if the desired amplitude is larger than or smaller than the present amplitude (block 284). At block 286, the processing circuit 204 determines the relative positions of the motors 140 and 142. The processing circuit 204 then ascertains the minimum shift in relative angle between the motors 140 and 142 that is needed to provide the desired amplitude and calculates the number of encoder counts associated with the minimum shift (block 288). The calculated number of encoder counts is allocated between the motors 140 and 142 at block 290 (an "allocation ratio"). In some embodiments, the counts may be evenly allocated between the motors 140 and 142. In other embodiments, the encoder counts are not evenly allocated.

By way of example, in the embodiment of FIG. 1, the physical configuration of the outer power shaft 162 results in increased torque for a given rotational speed of the motors 140 and 142. Accordingly, for a given encoder count modification, an increased current demand is required by the motor 140 as compared to the motor 142. By allocating the encoder counts by a proportion related to the difference in current demand for a given encoder count modification, the speed of the shift can be maximized while maintaining current demand of the motors 140 and 142 below a predefined threshold such as an over-current threshold. Thus, in one embodiment, an allocation ratio is used such that about two-thirds of the encoder counts are allocated to the motor 142 while about one-third of the counts are allocated to the motor 140. In some embodiments, it may further be desired to allocate positive encoder count shifts to the motor with the higher torque while using the other motor to effect negative encoder count shifts.

Once the encoder count shifts have been allocated between the motors 140 and 142 at block 290, the processing circuit 204 controls the motors 140 and 142 to shift by the allocated amount (block 292). During execution of block 292, the procedure 280 may continue to operate so as to refine the shifts that are performed to optimize system performance. By way of example, the sensor suite 212 may include amperage sensors associated with the motors 140 and 142. Thus, as the motors are shifting, the processing circuit 204 may modify the shifts of the motors 140 and 142 to maximize the speed of the amplitude modification while ensuring that motor amperage does not exceed predefined limits.

In one embodiment, the foregoing procedure is effected by the following shift motors routine programmed using GalilTools, available from Galil Motion Control of Rocklin, Calif.:
SHIFTXY; '(^a) . . . (magnitude);
ampltude=^a;
JS #CLCSIDE;
JS #CLCSHFT(ampltude);
JS #ROTMTRS(xshift,yshift,shifts,shiftwt);
EN
In the foregoing shift motors routine, the relative positions of the motors 140 and 142 are determined by the #CLCSIDE subroutine below:
CLCSIDE;
d=_TPX-_TPY;
h=halfturn;
course=d/(@ABS[d]);
chngside=@ABS[(@INT[d/h])];
modulo=2*(@FRAC[chngside/2]);
change=(-2)*modulo+1;
side=course*change;
EN
The #CLCSIDE subroutine determines the initial difference (d) between the motors 140 and 142 using the encoder counts of the motors 140 and 142. In the #CLCSIDE subroutine, and the other routines described below, the relative location of the motors 140 and 142 is discussed with reference to the system phase angle as diagrammed in FIG. 7. Thus, the motor 142 is assumed to be positioned with the geometric center 228 located on the vertical axis 232 and below the axis of rotation 170 of FIG. 7. The "course" calculation is used to define clockwise movement of the geometric center 230 from the zero phase position of FIG. 7 as a positive number and counterclockwise movement as a negative number.

The "chngside" calculation establishes which side of the vertical axis 232 the geometric center 230 is on by establishing the number of times the geometric center 230 would have crossed the vertical axis 232 to arrive at the present encoder count difference. In this routine and others described below, since the system phase angle is based upon a fixed location of the geometric center 228, all relative motion of the motors 140 and 142 is ascribed to movement of the geometric center 230 although in actuality both motors are used to provide relative movement as described more fully below.

The "modulo" calculation and the "change" calculation are used to assign a positive number (+1) if an even number of geometric center 230 crossings have occurred and to assign a negative number (−1) if an odd number of geometric center 230 crossings have occurred. Then, the minimum number of encoder counts between the present location and the zero system phase angle location of the geometric center 230 is determined. Thus, if the present position of the geometric center 230 is to the left of the vertical axis 232, the "side" calculation aids in determining the direction the geometric center 230 would need to move to achieve the desired amplitude. If the geometric center 230 is on the left, and an increased amplitude is desired, the geometric center 230 would need to move in a counterclockwise (negative) direction; if it is on the right, and an increased amplitude is desired, it would need to move in a clockwise (positive) direction. If a decreased amplitude is desired, the above directions required for the left and right sides would be reversed.

The #CLCSHFT subroutine is used to identify the minimum number of encoder counts that must be shifted to arrive at the new amplitude, as follows:

CLCSHFT; '(^a) . . . (magnitude);
ampltude=^a;
crease=2*((ampltde-magntude)>0)−1;
JS #EQATION(magntude);
arcmoveM=@RND[(theta/360)*fullturn];
JS #EQATION(ampltude);
arcmoveA=@RND[(theta/360)*fullturn];
arccount=@ABS[arcmoveA-arcmoveM];
arccount=shifts*(@RND[arccount/shifts]);
xcounts=(xratio/parts)*arccount;
ycounts=(yratio/parts)*arccount;
way=side*crease;
xshift=(@RND[xcounts/shifts])*way;
yshift=(@RND[ycounts/shifts])*way*reverse;
EN In the #CLCSHFT subroutine, "crease" is used to identify whether the desired amplitude ("amplitude") will be an increase (+1) or decrease (−1) in magnitude compared with the current magnitude ("magnitude"). In the event that there is no change in magnitude, then the "crease" would be zero. The EQATION subroutine is then invoked to determine the angle associated with the current magnitude ("magnitude"), and the "arcmoveM" calculation uses this newly-determined angle ("theta") to identify the minimum number of counts needed to move the geometric center 230 to the zero system phase angle location using either a clockwise or a counterclockwise relative movement. These exact same two steps are then repeated, this time using the desired amplitude ("amplitude") rather than the current magnitude ("magnitude"), and thus "arcmoveA" will use the angle associated with the desired amplitude ("amplitude") to identify the minimum number of counts needed to move the geometric center 230 to the zero system phase angle location using either a clockwise or counterclockwise relative movement.

The #EQATION subroutine is as follows (descriptive comments are provided in single quotes):

EQATION; '(^a) . . . (magnitude); 'Equation to find angle (geometry).'
ampltde=^a; 'Easier to read.'
xo=0.059; 'The offset (inches) of Y to X motors.'
n=(½)*ampltde; 'Half magnitude (inches).'
theta=2*@ASIN[n/(2*xo)]; 'Angle (from "n" and geometry).'
EN The #EQATION subroutine thus converts the given amplitude to a system phase angle difference using the System Phase Angle equation described above. In other words, the angle (theta) provided by the #EQATION subroutine will always be less than or equal to 180 degrees. The difference between the present angle (in encoder counts-arcmoveM) and the desired angle (in encoder counts-arcmoveA) is then calculated and the #CLCSHFT subroutine assigns the difference in encoder counts to the desired encoder shift (arccount).

The #CLCSHFT subroutine then modifies the arccount to be the nearest integer that is divisible, without remainder, by the number of shifts required or allocated, and allocates the encoder counts to the motors 140 and 142 (xcounts and ycounts) based upon a predetermined allocation ratio. Then, the actual number of encoder shifts for each of the motors 140 and 142 is calculated (xshift and yshift) and the directions of the motor shifts are established by multiplying both shifts (xshift and yshift) by "way". The "way" indicates the direction, and is based upon "side" and "crease." Since both values are either 1 or −1, the product of the values is also 1 or −1. Finally, the yshift is established in the opposite direction of the xshift by multiplying yshift by "reverse" (−1), thereby minimizing the required travel to arrive at the new system phase angle, and reducing the potential negative effects of large inertias.

The #SHIFTXY then uses the subroutine #ROTMTRS to control shifting of the relative phase of the motors 140 and 142.

The procedure 280 may also be modified to provide more rapid and precise amplitude modifications in operations wherein significant inertial forces are realized. For example, in bringing the ram 146 to a complete stop from a full amplitude oscillation (i.e., the motors 140 and 142 are 180 degrees out of phase), inertia of the weld components, carriage 118, ram 146 and other components may induce movement of the weld component held by the carriage 118 with respect to the weld component mounted to the forge platen 120. This movement may be detected by, for example, the LVDT associated with the ram 146. In response to undesired movements, the processing circuit 204 may modify the relative phase of the inner power shaft 160 and the outer power shaft 162 to dampen residual movement of the weld components.

The ability to rapidly stop all relative movement of the weld components provides for better welds and contributes to the increased efficiency of the linear friction welding system 100 discussed above. Moreover, the weld components can be placed under forge pressure without any axial loads (i.e., loads orthogonal to the forge axis) on the components or the associated tooling. In contrast, prior art systems terminate oscillation by application of a large axial force on the weld components resulting in the forge pressure being applied in the presence of a large axial load. The absence of an axial load on the weld components increases the quality of the final weld.

Rapid termination of movement of the ram 146 is also enhanced because the motors 140 and 142 and the associated inner power shaft 160 and outer power shaft 162 continue to rotate at a high rate. Accordingly, the stopping of movement of the ram 146 is not dependent upon countering inertia of the motors 140 and 142 and the associated inner power shaft 160 and outer power shaft 162. In addition to increased stopping speed, this results in reduced shock to the motors 140 and 142.

The ability to modify the amplitude and frequency of the motors 140 and 142 enables the linear friction welding system 100 to be used to form welds using different types of materials without requiring retooling of or physical modifications of the linear friction welding system 100. The precise control further enables unique capabilities including modified starting and stopping locations and varied scrub profiles.

With respect to starting and stopping locations, the foregoing examples discussed termination of oscillation of the ram 146 by matching the phase of the inner power shaft 160 and the outer power shaft 162 such that the ram 146 is maintained motionless at a mid-stroke location. By iteratively controlling the relative phase of the inner power shaft 160 and the outer power shaft 162 throughout a complete rotation of the shafts, the ram 146 may be maintained motionless at any location within a range of the stroke centered on the mid-stroke location and extending for a distance equal to twice the offset of the geometric center 228 of the eccentric portion 172 from the axis of rotation. By way of example, if both the geometric center 228 (see FIG. 7) of the eccentric portion 172 and the geometric center 230 of the eccentric 166 are 2 mm, then the ram 146 can be started or stopped at any desired location within plus or minus 2 mm of the center of the stroke or travel of the ram 146.

Similarly, the processing circuit 204 can control the motors 140 and 142 to oscillate about a location that is offset from the center of the stroke or travel of the ram 146. Thus, a scrub can be provided which preferentially heats one portion of a weld component. This enables uniform heating of components with varying weld cross-sections along the weld axis. Additionally, a scrub profile which heats one section to a higher temperature than another section can be established. This type of scrub profile may be useful when welding a component with different material constituents along the weld axis.

Figure 14:
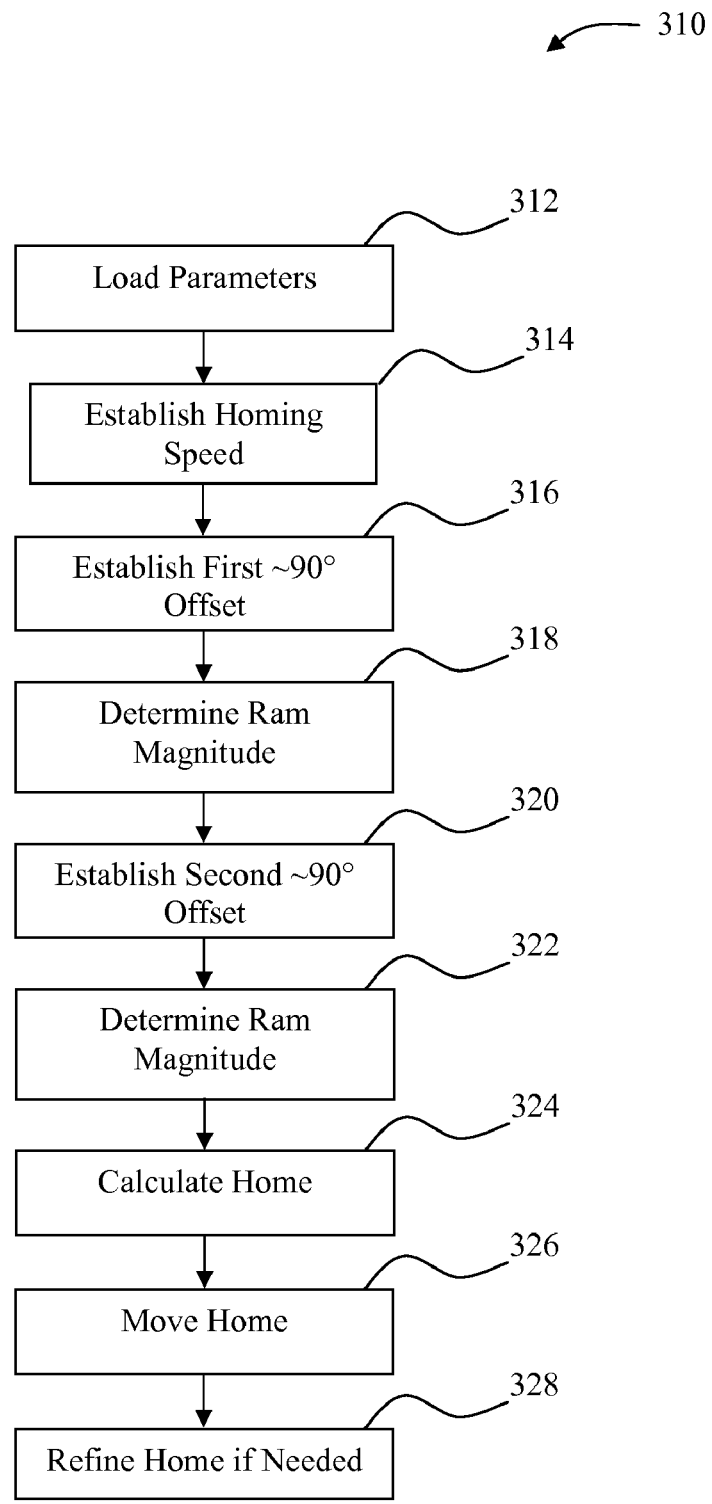
FIG. 14 depicts a procedure that can be executed under the control of the control system of FIG. 5 to achieve a system phase angle of zero.

Of course, the ability to perform the offset oscillations and varied scrub profiles as described above is optimally accomplished by exact understanding of the relative positions of the inner and outer power shafts 160/162. One approach to providing increased accuracy as to the relative positions of the inner and outer power shafts 160/162, which can be performed during block 226 of the procedure 220, is the homing procedure 310 of FIG. 14.

The procedure 310 begins by loading parameters from the parameters database 210 (block 312). The parameters may include the maximum acceleration and deceleration speed of the motors 140 and 142, along with a homing speed. The homing speed is the nominal speed of the motors 140 and 142 used during the procedure 310. The homing speed is typically selected to be significantly less than the maximum speed of the motors 140 and 142 to enhance accuracy of the process. Other variables and constants that may be used include the sample size for determining amplitude of the ram 146 stroke, the number of encoder counts associated with a full rotation and/or partial rotation of the motor shafts, and other increments, some of which are discussed in more detail below. The motors 140 and 142 are then brought to the homing speed (block 314).

Once at speed, the system phase angle is established at either about 90 degrees or about 270 degrees (block 316). The magnitude of the stroke of the ram 146 is then determined (block 318). The processing circuit 204 then controls the motors 140 and 142 to change the system phase angle by 180 degrees (block 320), and the magnitude of the ram 146 stroke is again determined. Based upon the obtained measurements at blocks 318 and 322, the encoder count shifts needed to achieve a zero system phase angle is calculated at block 324 as discussed in more detail below.

As noted above, the relationship between changes in encoder counts and changes in amplitude of the oscillation of the ram 146 is based upon the law of cosines. Accordingly, when the system phase angle is at zero or 180 degrees, changing the system phase angle by an amount associated with one encoder count results in a very small change in the amplitude of the oscillation of the ram 146. By establishing an approximately 90 degree or 270 degree system phase angle as described above, the change in amplitude per shift in encoder count is maximized. Accordingly, a more precise system phase angle is determined based upon the observed movement of the ram 146 and the System Phase Angle equation.

Consequently, at block 324 the calculated system phase angle at each of the two 90 degree offsets is determined. The two system phase angles are then used to determine an average system phase angle difference. Next, the average system phase angle difference is used to calculate the number of encoder counts needed to move home (the zero phase angle position of the geometric center 230) from the second 90 degree offset.

Once the number of encoder counts needed to move home from the second 90 degree offset has been calculated, the processing circuit 204 controls the motors 140 and 142 to move to the calculated home position whereat the system phase angle is zero (block 326). At block 328, movement of the ram 146 is used to verify that the system is at a zero system phase angle. If the ram 146 is moving by an amount larger than the noise level of the system, then incremental encoder shifts are used to reduce the ram 146 movement.

In one embodiment, the foregoing procedure is effected by the following automatic homing routine programmed using GalilTools, available from Galil Motion Control of Rocklin, Calif.:

```
#AUTO;
IF (@OUT[1]=1 [high]);
CB 1; [JS #DROPCYL];
WT prepwtA; [dropwait];
XQ #GOHOME, [HOME,]hmthread;
WT prepwtB; [JS #STARTWT];
ELSE;
XQ #GOHOME,hmthread; [JS #HOME];
ENDIF;
EN
```

In the automatic homing routine, the "if" statement is used to determine whether or not the main hydraulic press 122 is at the bottom location. If the hydraulic press 122 is not at the bottom, then CB 1 is used to allow the processing circuit 204 to control the hydraulic press 122 to its lowered position. The automatic homing routine then waits "dropwait" milliseconds for the cylinder to drop, allowing time for the top and bottom pieces to be welded to separate; after this wait time, and while the cylinder is still potentially lowering, the homing routine #HOME is executed in a separate thread to begin the actual homing process.

While the homing routine is executing, the subroutine #STARTWT enters a loop which ends only when both the cylinder has fully lowered and the homing routine has completed, preventing the program from enacting any other procedure before the cylinder is fully lowered and the homing routine has completed, but allowing any such procedure to commence almost immediately upon the later of the two conditions being met. If, on the other hand, the hydraulic press 122 is at the bottom, then the homing routine proceeds to a homing subroutine (described below).

The homing routine in this embodiment is as follows:
```
#HOME;
JS #STARTMG;
JS #INITIAL;
JS #TOSPEED
JS #FINDMAG;
JS #ANGLES;
JS #ENDARC;
JS #ARCMOVE;
JS #FINISH;
EN
```

In the homing routine, after various starting messages are rendered pursuant to execution of the #STARTMG subroutine, initial parameters are loaded using the #INITIAL subroutine as follows (descriptive comments are provided in single quotes):

```
#INITIAL; 'Initialize homing variables and constants.'
unknown=−1;
homed=unknown;
true=1;
false=0;
high=1;
low=0;
accspeed=10000; 'Acceleration speed.'
decspeed=10000; 'Deceleration speed.'
homspd=8192; 'Homing speed (should be relatively slow).'
samsize=128; 'Sample size for discerning magnitude.'
samwait=8; 'Wait time (8 ms) between samples.'
ipside=32; 'Increment to determine side.'
iprefine=24; 'Counts to increment in refining magnitude.'
ipwait=150; 'Wait time (150 ms) after incrementing.'
qrtrturn=1024; 'Quarter turn (90 degrees).'
halfturn=2048; 'Half turn (180 degrees).'
fullturn=4096; 'Full turn (360 degrees).'
reverse=−1; 'Reverses course/direction.'
right=1; 'Represents right side.'
left=−1; 'Represents left side.'
magntude=0; 'Current magnitude of motion (inches).'
deadzone=0.0170; 'Magnitude (inches)—inaccurate below.'
maxzone=0.2192; 'Magnitude (inches)—inaccurate above.'
maxnoise=0.0050; 'Magnitude (inches)—limit for homing.'
oldangle=0; 'Old angle when hunting for 90-degrees.'
newangle=0; 'New angle when hunting for 90-degrees.'
homed=false; 'Is false when not homed; true otherwise.'
hmthread=1; 'Thread for homing.'
seconds=1.024/1000;
homestrt=TIME*seconds; 'Starting time, in seconds, of homing.'
EN
```

In addition to the descriptions provided above, some of the initialized parameters are further described below.

Once the #INITIAL subroutine has completed, the following #TOSPEED subroutine is called to accelerate the motors 140 and 142 to the homing speed (descriptive comments are provided in single quotes):

```
#TOSPEED; 'Motors to speed.'
SH; 'Servo motors.'
DP 0,0; 'Define X&Y to 0.'
AC accspeed,accspeed; 'Acceleration.'
DC decspeed,decspeed; 'Deceleration.'
JG homspeed,homspeed; 'Jogging speed.'
BG XY; 'Begin X,Y move.'
AS XY; 'At Speed.'
EN
```

The following #FINDMAG subroutine may then be called by the homing subroutine (descriptive comments are provided in single quotes):

```
#FINDMAG; 'Find magnitude of motion.'
JS #CHCKMAG; 'Check current magnitude.
IF ((magntude<deadzone)|(magntude>maxzone)); 'If magnitude inaccurate . . . .'
   IF (magntude<deadzone); 'If magnitude too small . . . .'
      side=right; 'Side will be on right.'
   ELSE; '(magntude>maxzone); 'If magnitude too big . . . .'
      side=left; 'Side will be on left.'
   ENDIF; 'End "IF".'
   IPY=qrtrturn; 'Increment Y (¼)-turn.'
   WT 2*ipwait; 'Wait for motor settling.'
   JS #COLLECT; 'Discern new magnitude.'
ELSE; 'If magnitude accurate . . . .'
   JS #DETSIDE; 'Detect which side.'
ENDIF; 'End "IF".'
JS #EQUATOR; 'Find angles (90-degrees).'
EN
```

The #FINDMAG subroutine thus calls a #CHCKMAG subroutine (described more fully below) to ascertain the oscillation magnitude of the ram 146. The #FINDMAG subroutine determines the location of the geometric center 230 in the system phase angle diagram in relation to the vertical axis 232 through the geometric center 228 and the axis of rotation 170, as described above with reference to FIG. 7. If the detected motion correlates to a system phase angle of about zero or of about 180 degrees, then the determination of the location of the geometric center 230 is not as accurate as desired since the change in linear movement of the ram 146 for a given change of encoder counts is minimized around system phase angles of zero and 180. The system phase angles corresponding to these areas, referred to as a "dead zone" or a "maximum movement zone", respectively, are established by the initialized parameters of "deadzone" and "maxzone", respectively.

Because the precise orientation of the motors 140 and 142 may not be accurately determined based solely upon measured movement of the ram 146 in the dead zone and the maximum movement zone, the #FINDMAG subroutine assumes the location of the geometric center 230 to be to the right of the vertical axis 232 for ram magnitudes within the dead zone, while the geometric center 230 is assumed to be to the left of the vertical axis 232 for ram magnitudes within the maximum movement zone. In either event, the motors 140 and 142 are controlled to shift encoder counts by 90 degrees in the clockwise direction (IPY). Thus, the geometric center 230 is moved either from the dead zone to a 90 degree system phase angle or from the maximum movement zone to a 270 degree system phase angle, placing the geometric center 230 on the previously assumed side of the vertical axis 232. After waiting for the system to settle using an ipwait parameter loaded during the #INITIAL subroutine, the #COLLECT subroutine (described more fully below) is used to determine the magnitude of the ram 146 movement.

If the detected magnitude using the #CHCKMAG subroutine correlates to a system phase angle other than about zero or about 180 degrees, then the subroutine #DETSIDE (discussed more fully below) is used to determine on which side of the vertical axis 232 the geometric center 230 is located. Using the magnitude of motion of the ram 146 obtained at either the #CHCKMAG subroutine or the #COLLECT subroutine, the #EQUATOR subroutine is called to position the geometric center 230 at about the closest of either about 90 degrees or about 270 degrees system phase angle.

The #CHCKMAG subroutine in the #FINDMAG subroutine may be as follows (descriptive comments are provided in single quotes):

CHCKMAG; 'Check magnitude of motion.'
JS #COLLECT; 'Discern current magnitude of motion.'
IF (magntude<maxnoise); 'If current magnitude is within homing tolerance . . . .'
JS #FINISH; 'Finish (resolve situation, final steps).'
ENDIF; 'End "IF"'
EN The #CHCKMAG subroutine thus calls the #COLLECT subroutine to obtain a measurement of the movement of the ram 146. If the detected movement is less than the noise of the system (established using the "maxnoise" initial parameter), then the #FINISH subroutine (discussed more fully below) is invoked. Otherwise, the #CHCKMAG subroutine ends.

The #COLLECT subroutine, used in both the #FINDMAG and #CHCKMAG subroutines, may be as follows (descriptive comments are provided in single quotes):

COLLECT; 'Collect voltage samples.'
max=−1000000; 'Set maximum low (volts).'
Min=1000000; 'Set minimum high (volts).'
samples=0; 'No samples taken yet.'
SAMLOOP; 'Sample loop.'
samples=samples+1; New sample.'
val=@AN[2]; 'Grab current voltage.'
IF (val>max); 'If voltage>maximum . . . .'
max=val; 'Set maximum to voltage.'
ENDIF; 'End "IF"'
IF (val<min); 'If voltage<minimum . . . .'
min=val; 'Set minimum to voltage.'
ENDIF; 'End "IF"'
WT samwait; 'Wait (8 ms) for settling.'
JP #SAMLOOP, samples<samsize; 'Repeat, until enough samples.'
magntude=(max−min)*inchvolt; 'Set magnitude to difference.'
MG " ", max, " ", min, " ", (magntude); 'Print message.'
EN The #COLLECT subroutine is configured for use with the LVDT positioned to monitor movement of the ram 146. Accordingly, the #COLLECT subroutine first sets two registers used to capture the minimum and the maximum voltages output from the LVDT. The maximum voltage register (max) is set to a large negative number while the minimum voltage register (min) is set to a large positive number. Additionally, the sample counter (samples) is set to zero. The #COLLECT subroutine then calls a #SAMLOOP subroutine which increments the sample counter and obtains the present voltage output of the LVDT. The initial voltage returned will be greater than the large negative number in the maximum voltage register. Consequently, the large negative number is replaced in the maximum voltage register with the obtained voltage (max=val). The initial voltage returned will also be less than the large positive number in the minimum voltage register. Consequently, the large positive number is replaced in the minimum voltage register with the obtained voltage (min=val).

The #SAMLOOP subroutine then waits for 8 milliseconds (samwait from the #INITIAL subroutine) and performs another loop. For the second sample loop, the ram position will typically have moved. Accordingly, the voltage will be either greater than or less than the previously obtained voltage. If the voltage is greater than the previously obtained voltage, then the newly obtained voltage replaces the number previously stored in the maximum voltage register (max=val). The newly obtained voltage in this case will also be greater than the number stored in the minimum voltage register. Accordingly, the number previously placed in the minimum voltage register is not replaced. Similarly, If the voltage obtained during the second sample loop is less than the previously obtained voltage, then the newly obtained voltage replaces the number previously stored in the minimum voltage register (min=val). The newly obtained voltage in this second case will also be less than the number stored in the maximum voltage register. Accordingly, the number placed in the maximum voltage register is not replaced.

The above sample loop continues until the number of samples is equal to the samsize loaded during the #INITIAL subroutine. In this example, the sample size is 128. The sample size, motor rotation speed, and wait between samples are selected in this example to provide samples over two complete revolutions of the motors 140 and 142. By selecting a sample size that ensures samples are obtained over at least one complete ram stroke, the maximum voltage output during the stroke will be stored in the maximum voltage register and the minimum voltage output during the stroke will be stored in the minimum voltage register. The difference between the two stored values is then used to calculate the amplitude of the stroke made by the ram 146.

With reference again to the #FINDMAG subroutine, in the event the ram stroke magnitude is not in the dead zone or the maximum movement zone, the #FINDMAG subroutine calls the #DETSIDE subroutine to ascertain on which side of the vertical axis 232 the geometric center 230 is located. The #DETSIDE subroutine is as follows (descriptive comments are provided in single quotes):

DETSIDE; 'Detect orientation of Y-motor (which side).'
target=magntude; 'Save current magnitude.'
JS #SIDEINC; 'Increment small, positive, amount.'
IF (target<magntude); 'If magnitude has increased . . . .'
side=right; 'On right side.'
ELSE; IF (target>magntude); 'If magnitude has decreased . . . .'
side=left; 'On left side.'
ELSE; 'If magnitude has stayed the same (error?) . . . .'
JS #FINISH; 'Finish (resolve situation, final steps).'
ENDIF; ENDIF; 'End "IF"s.'
EN The #DETSIDE subroutine saves the magnitude of the just-determined ram stroke and calls the #SIDEINC subroutine (discussed more fully below) to perform one small shift of the geometric center 230 in a clockwise direction. If the shift increases the detected motion of the ram 146 (motion is detected in the #SIDEINC subroutine after the shift), then the shift has caused the system phase angle to move toward the 180 degree system phase angle. Accordingly the geometric center 230 is on the right side of the vertical axis 232 in the system phase angle diagram. Conversely, if the shift decreases the detected motion of the ram 146, then the shift has caused the system phase angle to move toward the zero degree system phase angle. Accordingly the geometric center 230 is on the left side of the vertical axis 232 in the system phase angle diagram.

The #SIDEINC subroutine is as follows (descriptive comments are provided in single quotes):

SIDEINC; 'Side increment (move Y-motor a small amount to find side).'

IPY=ipside; 'Increment Y-motor 32 counts in order to find side.'
WT ipwait; 'Wait (150 ms) for motor to settle.'
JS #COLLECT; 'Discern new magnitude of motion.'
EN Thus, the motor 140 is moved by 32 counts with respect to the motor 142 in the clockwise direction (IPY). After waiting for the system to settle by an amount that can be set during the #INITIAL subroutine (ipwait), the #COLLECT subroutine described above is called to determine the magnitude of the stroke of the ram 146.

Returning to the #DETSIDE subroutine, in the event that the side cannot be detected, indicating an error in the system, the #FINISH subroutine is called in order to exit the homing routine. Otherwise, the DETSIDE subroutine ends and the #FINDMAG subroutine proceeds to call the following #EQUATOR subroutine (descriptive comments are provided in single quotes);

EQUATOR; 'Find an angle near "equator" (90 or 270 degrees).'
JS #EQATION(magntude); 'Use equation to find current angle to "Home".'
theta=(90-theta)*side; 'Calculate angle and direction to go to 90 or 270.'
JS #ARCMOVE; 'Move that angle and direction to go to 90.'
EN The #EQATION subroutine (described above) is called and used to determine the system phase angle difference between the present position and home, based upon the detected magnitude of the stroke of the ram 146. Subtracting the system phase angle difference from 90 and using the side (determined during the #SIDEINC subroutine above) provides a new angle (theta) between the present location and the nearest equator (90 degrees or 270 degrees system phase angle). The #ARCMOVE subroutine is then called.

The #ARCMOVE subroutine is as follows (descriptive comments are provided in single quotes):

ARCMOVE; 'Arc move (counts and direction to go angle theta).'
arcmove=@RND[(theta/360)*fullturn]; 'Calculate the counts to angle theta.'
IPY=arcmove; 'Move Y-motor that number of counts.'
WT ipwait; 'Wait (150 ms) for motor to settle.'
JS #CHCKMAG; 'Check current magnitude of motion.'
EN Thus, the calculated angle theta, which will always be between 0 and 180 degrees, inclusive, is converted to an associated encoder count. The motor 142 is then controlled to shift the calculated number of encoder counts (IPY) and the system is allowed to settle. The #ARCMOVE subroutine then calls the #CHCKMAG subroutine (described above) and a magnitude of the stroke of the ram 146 is obtained. The #ARCMOVE subroutine, the #EQUATOR subroutine, and the #FINDMAG subroutine then end.

Continuing with the #HOME subroutine, after the #FINDMAG subroutine has ended, the geometric center 230 is positioned at or about either 90 degrees or 270 degrees with reference to the system phase angle diagram of FIG. 7 and the amplitude of the stroke of the ram 146 is known. The #HOME subroutine then calls the #ANGLES subroutine which is as follows (descriptive comments are provided in single quotes):

ANGLES; 'Find two angles at nearly 90-degree orientation.'
JS #EQATION(magntude); 'Use equation to find current angle to "Home".'
oldangle=theta; 'Save current, already nearly 90-degrees, angle.'
IPY=halfturn; 'Rotate Y-motor a half-turn (180 degrees).'
WT 2*ipwait; 'Wait (300 ms) for motor to settle.'
side=side*(−1); 'Now on opposite side.'
JS #COLLECT; 'Discern current magnitude of motion.'
JS #EQATION(magntude); 'Use equation to find current angle to "Home".'
newangle=theta; 'Save new, nearly 90-degrees, angle.'
EN The #ANGLES subroutine calls the #EQATION subroutine (described above) to ascertain the angle between the present system phase angle based upon the detected magnitude of the stroke of the ram 146. This value is stored as "oldangle". The motor 142 is then controlled to rotate 180 degrees (IPY) and the system is allowed to settle.

The "side" indicator is reversed to reflect the 180 degree movement and the #COLLECT subroutine (described above) is called to determine the magnitude of the stroke of the ram 146 at the new location. The newly detected magnitude of the stroke of the ram 146 is then used in the #EQATION subroutine (discussed above) to calculate the present location of the geometric center 230 with reference to the system phase angle diagram of FIG. 7. This newly calculated angle is saved as "newangle" and the #ANGLES subroutine ends.

The #HOME subroutine then calls the #ENDARC subroutine which is as follows (descriptive comments are provided in single quotes):

ENDARC; 'Compute ending arc to move to "Home".
avgangle=(oldangle+newangle)/2; 'Average two nearly 90-degree angles.
endside=side*(−1); 'Direction to "Home".
endangle=avgangle*endside; 'End angle is needed angle & direction.
theta=endangle; 'Make "theta" endangle (for "EQATION").
EN The #ENDARC subroutine averages the absolute value of the oldangle and newangle values determined during the #ANGLES subroutine and uses the "side" value to establish the direction which the geometric center 230 needs to move in order to establish a system phase angle of zero. The average angle and direction data are then saved as "theta" and the ENDARC subroutine ends.

The #HOME subroutine then calls the #ARCMOVE subroutine (described above) which uses the newly saved theta to control the motor 142 to a zero system phase angle. If a zero system phase angle (within the system noise) is achieved during this move, then when the #ARCMOVE subroutine calls the #CHCKMAG subroutine, the #FINISH subroutine is called by the #CHCKMAG subroutine. Otherwise, the #ARCMOVE subroutine and the #CHCKMAG subroutine end and the #FINISH subroutine is called by the #HOME subroutine.

The #FINISH subroutine is as follows (descriptive comments are provided in single quotes):

FINISH; 'Resolve situation; final steps.
IF (magntude>=maxnoise); 'If magnitude>=homing limit . . .
target=magntude; 'Save current magnitude.
JS #EQATION(magntude); 'Compute angle for magnitude.
JS #ARCMOVE; 'Increment that angle.
move=arcmove*(target−magntude);' "Move" is non-unitary direction.
course=move/(@ABS[move]); '"Course" is unitary direction.

IF (magntude>=maxnoise); 'If new magnitude>=homing limit . . .
IF (@ABS[arcmove]<=iprefine); 'If "iprefine" is too big . . .
iprefine=(½)*iprefine; 'Make "iprefine" half as large.
ENDIF; 'End "IF".
REFINE; 'Begin REFINing process/loop.
target=magntude; 'Save current magnitude.
IPY=iprefine*course; 'Move right amount and direction.
WT 2*samwait; 'Wait (16 ms) for motor to settle.
JS #COLLECT; 'Discern new magnitude of motion.
IF (target<magntude); 'If magnitude has increased . . .
course=reverse*course; 'Reverse course/direction.
ENDIF; 'End "IF".
JP #REFINE, (magntude>=maxnoise); 'Continue REFINing, until homed.
ENDIF; 'End "IF".
ENDIF; 'End "IF".
IF (magntude<maxnoise); 'If magnitude<homing limit . . .
homed=true; 'Homing succeeded.
ENDIF; 'End "IF".
JS #FINAL; 'Final, "clean up", steps.
EN The #FINISH subroutine first checks to see if the magnitude of the stroke of the ram 146 is less than the system noise. If not, then the value stored as "magntude" is stored as "target", and the #EQATION subroutine (discussed above) is called to calculate the angle needed to move the geometric center 230 to the vertical axis 232. The #ARCMOVE subroutine (described above) is then called to move the geometric center 230 by the calculated number of encoder counts. The size and direction of the move is stored ("move" and "course").

If the magnitude calculated during the #ARCMOVE subroutine is still greater than the system noise, the #FINISH subroutine checks to see if the amount that was just moved is less than the initial parameter stored for "iprefine". If so, then the iprefine parameter is reset to a value ½ of the original iprefine value. The #FINISH subroutine then calls the #REFINE subroutine which is shown above as imbedded in the #FINISH subroutine.

The #REFINE loop saves the current magnitude of the stroke of the ram 146 and then moves the motor 142 by the number of encoder counts stored as the iprefine parameter in the direction that was moved during the last #ARCMOVE subroutine. After allowing the system to settle, the #COLLECT subroutine is called to ascertain the magnitude of the stroke of the ram 146. If the new magnitude of the stroke of the ram 146 is larger than the previously ascertained magnitude of the stroke of the ram 146, then the #REFINE loop moved the motor 142 in the wrong direction and the "course" parameter is reversed and the #REFINE loop is re-executed.

If after executing the #REFINE loop the magnitude has not increased but the magnitude is still larger than the system noise, then the #REFINE loop is re-executed. The #REFINE loop continues until the magnitude calculated during the #COLLECT subroutine is less than the magnitude associated with system noise, at which point the #FINAL subroutine is called.

The #FINAL subroutine is as follows (descriptive comments are provided in single quotes):
FINAL; Final steps.'
ST AB; 'Stop X and Y motors.'
AM AB; 'After Movement of motors . . . .'
IF (homed=true); 'If homing succeeded . . . .'
DP 0,0; 'Define X & Y positions to 0.'
homedone=TIME*seconds; 'Time that homing ended.'
hometime=(homedone−homestrt); 'Total time for homing.'
MG "Homing Completed"; 'Print "Homing Completed".'
ELSE; '(homed=false); 'If homing failed . . . .'
MG "Homing Failed"; 'Print "Homing Failed".'
ENDIF; 'End "IF".'
MG "(Time: ", hometime,")"; 'Print total homing time.'
EN The #FINAL subroutine thus stops the motors 140 and 142 while defining and storing the encoder location of the "home" position ("DP 0.0"). The #FINAL subroutine further provides various data associated with the homing process. Upon printing the time taken to complete the homing process, the #FINAL subroutine ends.

Figure 15:
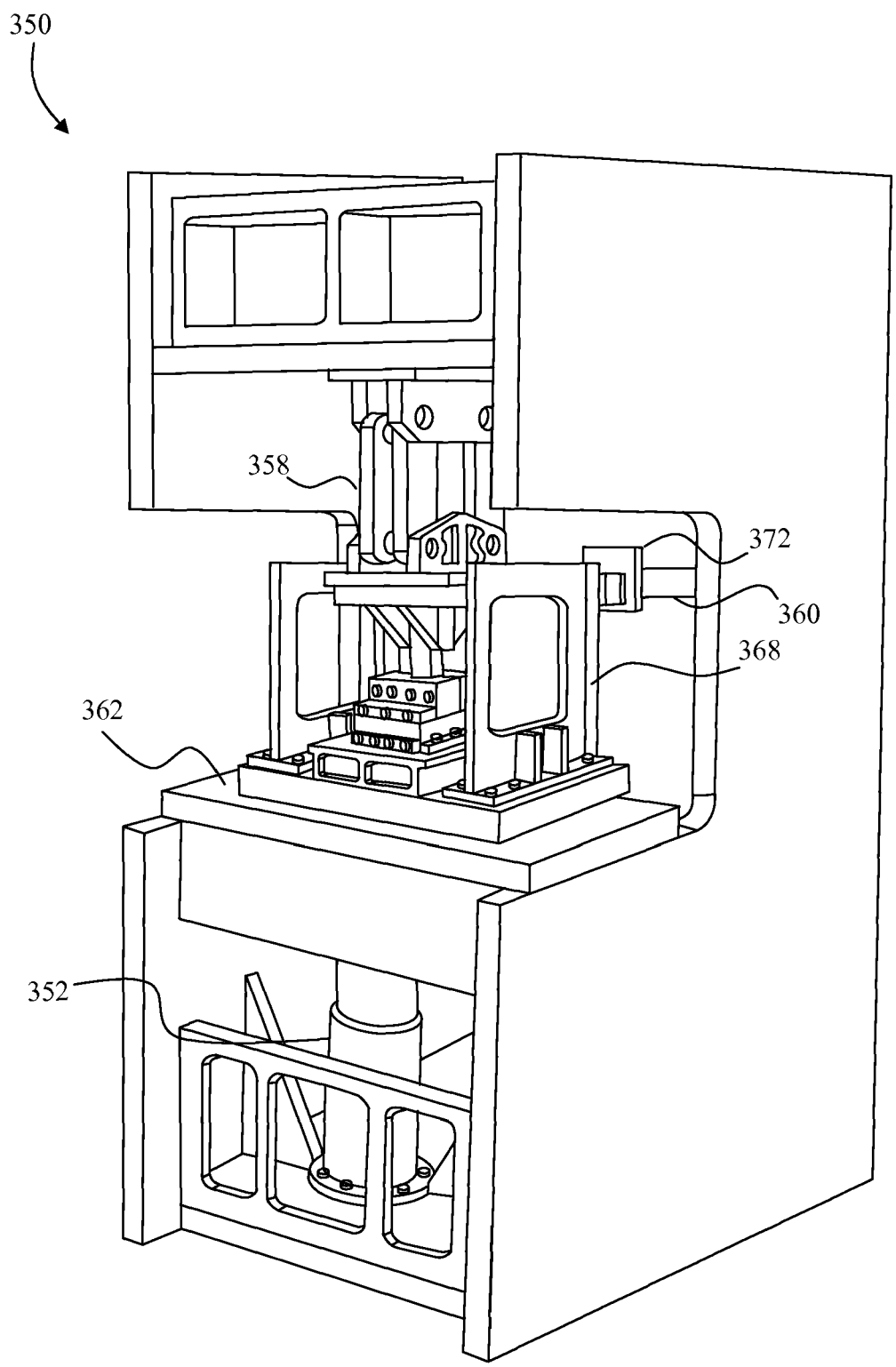
FIG. 15 depicts a perspective view of an alternative linear friction welding system incorporating auxiliary stiffening members to reduce undesired vibration of the forge platen.
Figure 16:
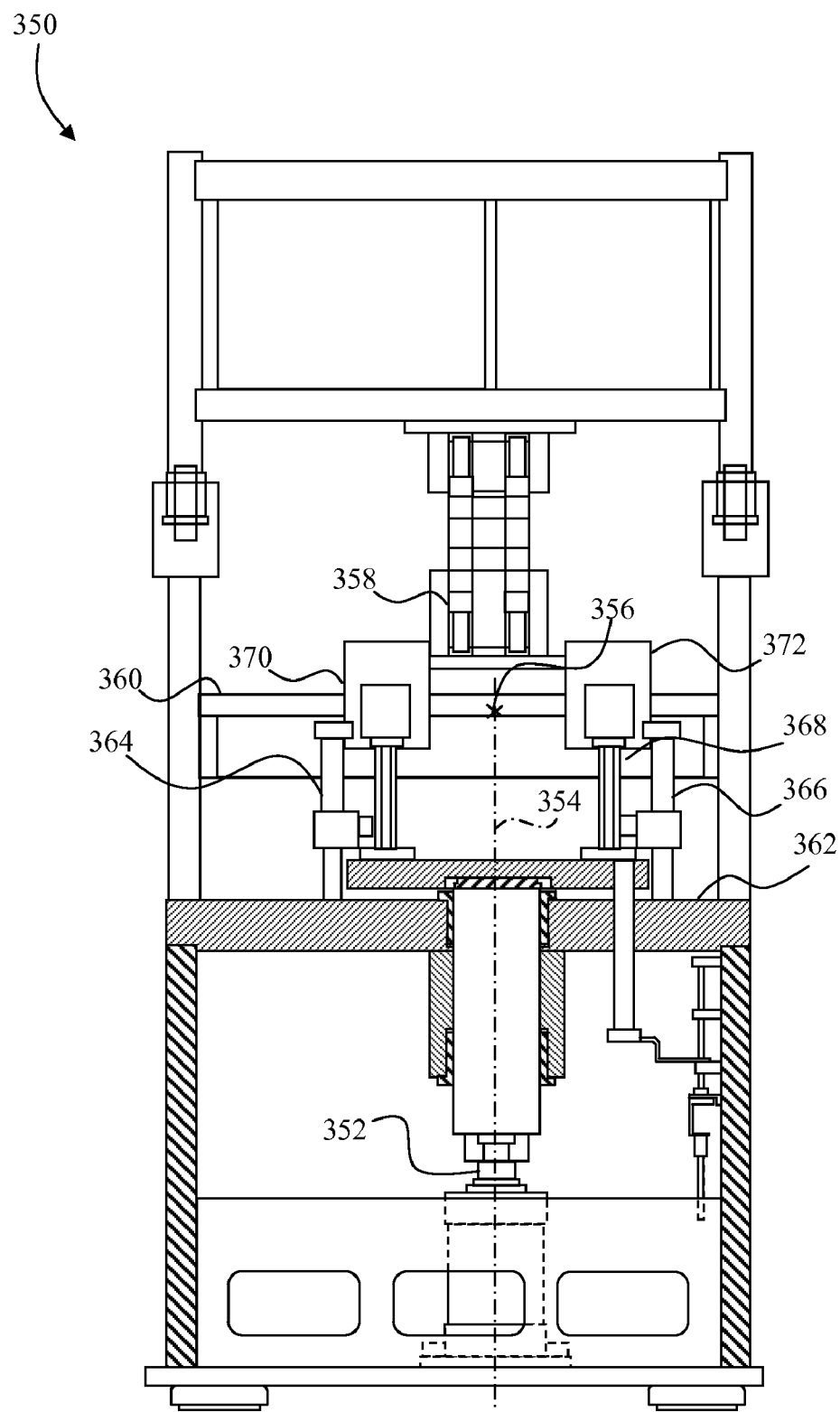
FIG. 16 depicts a partial front cross-sectional view of the friction welding system of FIG. 15.

If desired, various modifications to the linear friction welding system 100 may be made to optimize the system 100 for particular welding operations. By way of example, vibrations within the system may be alleviated by the incorporation of additional hydraulic presses. As depicted in FIGS. 114 and 15, a linear friction welding system 350 generally includes the same components described above with respect to the linear friction welding system 100 of FIG. 1. The linear friction welding system 350 thus includes a main hydraulic press 352 which defines a press axis 354 that is aligned with a welding axis 356. A carriage assembly 358 is located above the welding axis 356 and aligned with the press axis 354

The linear friction welding system 350 further includes an auxiliary support bracket 360 which is positioned higher than a support plate 362. A pair of auxiliary hydraulic press units 364 and 366 (not shown in FIG. 15) are mounted to a platen frame 368 which is slidably guided by guides 370 and 372 which are in turn fixedly attached to the bracket 360.

In operation, the auxiliary hydraulic press units 364 and 366 may be used in place of or in conjunction with the main hydraulic press 352. The hydraulic press units 364 and 366 press against the support plate 362 forcing the platen frame 368 upwardly toward the carriage 358. As the platen frame 368 moves upwardly, the platen frame 368 rides within the guides 370 and 372 which allow vertical movement while constraining horizontal movement. Accordingly, when the carriage is oscillating along the welding axis 356, movement of the platen frame 368 along the welding axis 356 is constrained.

While the present invention has been illustrated by the description of exemplary processes and system components, and while the various processes and components have been described in considerable detail, the applicant does not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

The invention claimed is:
1. A linear friction welding system comprising:
a ram configured to vibrate along a welding axis;
a cam follower operably connected to the ram;
an eccentric including an eccentric outer periphery operably engaged with the cam follower, and an inner periphery;
a first power shaft slidingly engaged with the eccentric; and
a second power shaft eccentrically engaged with the inner periphery.

2. The system of claim 1, wherein the second power shaft is eccentrically shaped.

3. The system of claim 1 wherein:
the first power shaft and the second power shaft are coaxial; and
a portion of the second power shaft is rotatably received within a cavity in the first power shaft.

4. The system of claim 1, wherein the first power shaft is slidingly engaged with the eccentric through a coupler, the coupler forming a first tongue and groove connection with the eccentric and a second tongue and groove connection with the first power shaft.

5. The system of claim 1, further comprising:
a first motor configured to rotate the first power shaft;
a second motor configured to rotate the second power shaft;
a memory including program instructions; and
a controller operably connected to the first motor, the second motor, and the memory, and configured to execute the program instructions to
rotate the first and the second motor at a first speed,
control the relative phase between the first and the second power shaft such that the ram does not vibrate along the welding axis,
establish a first pressure between two components to be welded after controlling the phase such that the ram does not vibrate, and
modify the relative phase between the first and the second power shaft such that the ram vibrates along the welding axis after the first pressure has been established.

6. The system of claim 5, wherein the controller is further configured to execute the program instructions to:
control the modified relative phase between the first and the second power shaft based upon a sensed vibration amplitude of the ram.

7. The system of claim 5, wherein the controller is further configured to execute the program instructions to:
establish a second pressure between the two components to be welded after modifying the phase; and
further modify the relative phase between the first and the second power shaft such that the ram vibrates along the welding axis after the second pressure has been established.

8. The system of claim 7, wherein the controller is further configured to execute the program instructions to:
identify a vibration frequency associated with the second pressure; and
rotate the first and the second motor at a second speed associated with the identified vibration frequency after establishing the second pressure.

9. The system of claim 8, wherein the controller is further configured to execute the program instructions to:
finally modify the relative phase between the first and the second power shaft such that the ram does not vibrate along the welding axis after the second pressure has been established.

10. The system of claim 9, wherein finally modifying the relative phase between the first and the second power shaft comprises:
reducing the speed of a selected one of the first motor and the second motor; and
increasing the speed of the other of the first motor and the second motor.

11. A linear friction welding system comprising:
a ram configured to vibrate along a welding axis;
a first power shaft operably connected to the ram and associated with a first eccentricity;
a second power shaft operably connected to the ram and associated with a second eccentricity;
a memory including program instructions; and
a controller operably connected to the memory, and configured to execute the program instructions to
control the phased relationship between the first eccentricity and the second eccentricity such that the ram does not vibrate along the welding axis while the first power shaft and the second power shaft are rotating,
establish a first pressure between two components to be welded after controlling the phased relationship such that the ram does not vibrate, and
modify the phased relationship such that the ram vibrates along the welding axis after the first pressure has been established.

12. The system of claim 11, wherein:
the first eccentricity is provided by a first eccentric outer periphery of an eccentric; and
the first power shaft is slidably associated with the eccentric through at least one tongue and groove arrangement.

13. The system of claim 12, wherein:
the second eccentricity is provided by a second eccentric outer periphery of the second power shaft; and
the second eccentric outer periphery is engaged with an inner periphery of the eccentric.

14. The system of claim 13, further comprising:
a cam follower operably engaged with the first eccentric outer periphery and the ram.

15. The system of claim 11, further comprising:
a press assembly configured to establish the first pressure.

16. The system of claim 15, further comprising:
a first sensor configured to sense movement of the press assembly.

17. The system of claim 11, wherein the press assembly comprises:
a first hydraulic press defining a first press axis, the first press axis intersecting the welding axis;
a second hydraulic press defining a second press axis, the second press axis spaced apart from the first press axis and the welding axis; and
a third hydraulic press defining a third press axis, the third press axis spaced apart from the first press axis and the welding axis.

18. The system of claim 15, further comprising:
a second sensor configured to sense movement of the ram.

19. The system of claim 18, wherein the controller is further configured to execute the program instructions to:
obtain a signal from the second sensor associated with movement of the ram; and
modify a control parameter of a motor operably connected to the second power shaft to maintain the modified phased relationship.

20. The system of claim 11, wherein:
the first power shaft defines an axis of rotation;
an end portion of the first power shaft includes a cavity positioned about the axis of rotation; and
the second power shaft includes a projection rotatably received within the cavity.

* * * * *